United States Patent [19]

Driscoll et al.

[11] 4,180,860

[45] Dec. 25, 1979

[54] DISPLAY STATION HAVING UNIVERSAL MODULE FOR INTERFACE WITH DIFFERENT SINGLE LOOP CONTROLLERS

[75] Inventors: Richard O. Driscoll, Mansfield; William E. Jordan, Norton; Richard L. McAllister, Canton, all of Mass.

[73] Assignee: The Foxboro Company, Foxboro, Mass.

[21] Appl. No.: 809,148

[22] Filed: Jun. 21, 1977

[51] Int. Cl.² .......................... G06F 3/14; G06F 15/46
[52] U.S. Cl. .................................. 364/900; 364/103; 364/120; 340/754
[58] Field of Search ... 364/200 MS File, 900 MS File, 364/103, 107, 118, 120; 340/147 P, 163, 213 Q, 324 R, 324 A, 324 AD, 324 M, 518, 151, 525, 722, 753, 754; 318/562, 565

[56] References Cited

U.S. PATENT DOCUMENTS

| Re. 28,221 | 11/1974 | Benghiat | 364/200 |
|---|---|---|---|
| 3,541,513 | 11/1970 | Paterson | 364/200 |
| 3,781,850 | 12/1973 | Gicca | 340/324 AD |
| 3,971,000 | 7/1976 | Crumwell | 364/200 |
| 3,976,981 | 8/1976 | Bowden | 364/900 |
| 4,001,807 | 1/1977 | Dallimont | 340/324 A |

*Primary Examiner*—James D. Thomas
*Attorney, Agent, or Firm*—Andrew T. Karnakis; Frank J. Fleming

[57] ABSTRACT

A universal module serves as the basis for creating a plurality of different embodiments of electrical display stations. The universal module is adapted to be connected to remotely located process control instrumentation from which it may receive and to which it may transmit analog and digital signals. The different embodiments are created by connecting to the universal module a selected combination of components such as status indicators, switches and signal adjusting devices. The universal module includes a micro-processor system having a central processing unit, a clock circuit and a non-volatile type of program storage unit with an address provided for each different embodiment. An embodiment selector provides the interconnection between the components connected to an embodiment and the circuits of the universal module and activates the address for the embodiment. The micro-processor system provides reference frequency and control signals which control the energization of the electrical display panel to display thereon the amplitude of signals in a selected variety of modes. The micro-processor system also performs all of the other functions prescribed for an embodiment such as controlling analog and digital multiplexing operations, controlling analog to digital and digital to analog conversions, routing of signals to status indicators, performing computations involving signals and the like.

16 Claims, 12 Drawing Figures

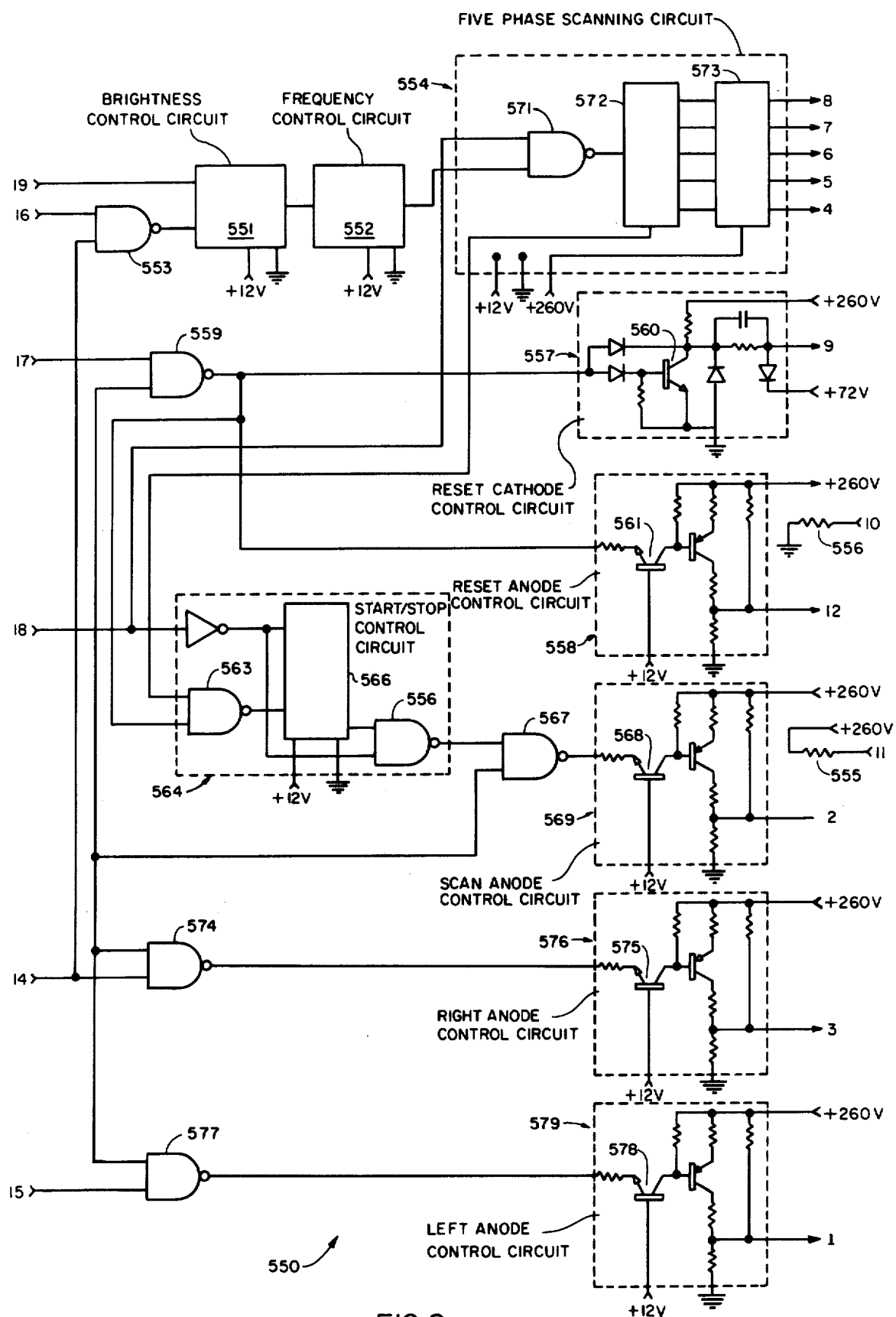
FIG. 8 DISPLAY DRIVER CURCUIT

DISPLAY STATION HAVING UNIVERSAL MODULE FOR INTERFACE WITH DIFFERENT SINGLE LOOP CONTROLLERS

BACKGROUND OF THE INVENTION

1. Field of the Invention

This invention relates broadly to industrial process control instrumentation. More particularly, this invention relates to improved electrical display stations of the type which are connected to process control instrumentation for the purpose of providing operating personnel with a visual display of the amplitude and status of signals pertinent to the process being controlled and providing means which enable the operating personnel to exercise control over the process.

2. Description of the Prior Art

Electrical display stations have been in use in the process industry for many years. During these years, the amount of information required by operating personnel in order to exercise control over a process has increased. Much of the information has been available but at various locations where it is not directly viewable by one person. For example, the electrical display stations have provided one person with the indication of the measurement and set-point signals. However, other signals, such as ratio and alarm signals have been available only at remote locations. This situation has lead to the need to have one person make an adjustment at the remote location while another person observed the result of the adjustment at the electrical display station and relayed instructions back to the person making the adjustment.

In attempts to provide the type of information required at the electrical display station, manufacturers have been faced with the problem of supplying a greater selection of embodiment of stations to meet the requirements for each process and each industry. However, these attempts have still not solved the problem of consolidating all of the information and adjustments at one station.

Until recently, electrical display stations have used instruments having moving pointers, such as ammeters or voltmeters, to display the amplitude of signals. As is well known, instruments having moving pointers are subject to changes in calibration due to vibration and wear. As a result, it has been necessary to calibrate each station at the factory and recalibrate it after installation. Thereafter, a station required recalibration at intervals depending on the conditions to which the station was subjected.

Recently electrical type of display panels, such as light emitting diodes and gaseous discharges devices, have come into use to display signals in bar graph mode. Inasmuch as these types of displays have no moving parts, once they are calibrated at the factory, they retain the calibration. Therefore, they eliminate the need for recalibration. However, to date, the electrical display stations utilizing these electrical type of display panels have merely followed past practices insofar as the signals displayed and adjustments available are concerned. In addition they have used conventional circuits for controlling the energization of the display panels. These conventional circuits have included oscillators and clock circuits for controlling the scanning circuits. If any other functions were performed by a station, such as computations, independent conventional circuits have been used in addition to the conventional circuits for controlling the energization of the display.

Also quite recently, cathode-ray tubes have been employed to display selected signals. The cathode-ray tubes have been limited to use in connection with digital process control systems. Due to the relatively high cost of digital control systems, they are not economically feasible unless a large number of process control loops are involved. This precludes the use of cathode-ray tubes for electrical display stations for users having too few process control loops. Further, regardless of the number of available process control loops, many users prefer the simplicity of an electrical display station dedicated to a single process control loop.

In the past, because of the construction of the electrical display station, it has been necessary to use trained personnel to assemble a station. In view of the wide variety of embodiments of electrical display stations required to provide a complete line to the process industries, manufacturers have had to carry an inventory of each embodiment or assemble each embodiment upon receipt of an order. In the event a customer needed to have an electrical display station modified, it had to be returned to the manufacturer for modification or exchanged for another embodiment.

SUMMARY OF THE INVENTION

This invention is directed to a universal module which serves as the basis for creating a plurality of embodiments of electrical display stations, each of which differs from other embodiments in functions performed and signals displayed. The universal module is adapted to be connected by a multiple conductor cable to remote process control instrumentation from which it may receive signals and to which it may transmit signals. Each embodiment is created by connecting to the universal module a combination of components unique to the embodiment selected from status indicators, switches, signal adjusting devices and the like.

A micro-processor system includes a central processing unit, clock circuit and a non-volatile memory storage unit. The memory storage unit provides an address for each embodiment of the electrical display station to be included in the product line. An embodiment selector is connected to the universal module to interconnect the circuits therein and to activate the address for an embodiment. When an address is activated, the micro-processor system processes signals in a prescribed manner through selected routines and sub-routines.

The clock circuit of the micro-processor system generates a reference frequency which provides the timing for scanning and processing digital signals through the selected routines and subroutines in the memory storage system unit and performs the functions required in the central processing unit.

The micro-processor system produces digital control signals which activate control elements in a display driver circuit to control the energization of the anodes of the electrical display unit and the brightness of the display appearing on the electrical display unit. The micro-processor system also supplies the same reference frequency which provides the timing for the production of the digital control signal to the display driver circuit for the sequential scanning energization of the cathodes of the electrical display unit. This dual use of the reference frequency makes it possible to synchronize the digital signals which control the energization of the anodes with the scanning energization of the cathodes so that the amplitude of an analog signal may be accurately displayed on the electrical display unit. In addition to the production of the digital control signals for the display driver circuit, the micro-processor system performs all of the other prescribed functions for an embodiment such as controlling analog and digital multiplexing operation, controlling analog to digital and digital to analog conversion, routing of signals, performing computations involving signals and the like.

An important result of this invention is the amount of information made available to operating personnel at a single convenient location at the time the information is needed for controlling the process. The amount of information can be varied with each embodiment. As an example, using a two bar graph display panel, two selected signals may be alternately flashed on one bar and a third signal recalled by actuating a switch to replace the alternately displayed signals. At the same time, three selected signals may be displayed simultaneously on the second bar and fourth and fifth signals recalled to replace the three signals. When more than one signal is displayed on a bar graph display panel, one of the signals may be made brighter than the other so it may be readily distinguished from the others. In addition, any of the signals may be changed from a constant mode of display to an alarm alerting mode, such as a flashing signal, to indicate an alarm condition and the alarm alerting mode may be disconnected by actuating a switch. The manner in which the signals may be displayed and the other operations performed by the use of the microprocessor system will be better appreciated as the individual embodiments are described later herein.

The connections to the universal module are preferably of the plug-in type for ease of assembly. By selectively mating the connections, electrical circuit paths are selected so that a single component serves for a plurality of different functions when installed in different embodiments.

The ease with which the components can be connected to the universal module enable relatively unskilled personnel to assemble each embodiment of the electrical display station. The ease of assembling embodiments is an important feature for two reasons. First, the manufacturer may assemble each electrical display station upon receipt of an order rather than maintain an inventory of each embodiment. This not only saves the cost of maintaining the inventory of each embodiment, but also reduces the cost of record keeping associated with such an inventory. Secondly, the user also benefits in two ways. It is often desirable to modify an electrical display station installed on a new process or it may be desirable to use electrical display stations removed from a discontinued process on a new process. In either case, the ease of creating an embodiment enables the user to make modifications in the field. The user may eliminate the need to keep on hand a variety of standby electrical display stations necessary to install in the place of one removed from the process for service. The user need only keep available a minimum number of universal modules and components from which semi-skilled personnel are able to create any embodiment required.

In process control instrumentation of the type which includes integral mode of control, it is the usual practice to provide means for preventing any upset from occurring in the process at the time the instrumentation is switched between automatic and manual modes of operation. The present invention provides means for preventing an upset from occurring when the process control instrumentation is switched between receiving a remotely generated set-point signal to receiving a locally generated set-point signal.

It is the object of this invention to provide a universal module which is adapted to serve as the basis for creating an entire line of electrical display stations.

It is another object of this invention to provide a universal module to which can be connected selected combinations of components to create embodiments thereof by relatively unskilled personnel.

It is still another object of this invention to provide a universal module which requires less inventory and inventory control to provide an entire line of stations.

It is a further object of this invention to provide a universal module having a more extensive choice in the number of signals which may be displayed and of the modes in which the signals may be displayed.

It is still a further object of this invention to provide a universal module having means for switching signals displayed in a variety of manners.

It is still a further object of this invention to provide a universal module having means for preventing an upset from occurring in a process when the process control instrumentation is switched between receiving a remotely generated set-point signal and a locally generated set-point signal.

DESCRIPTION OF THE DRAWINGS

The objects and advantages of this invention will in part be pointed out and in part apparent from the following description considered together with the accompanying drawings.

FIG. 8. A circuit diagram of the display driver unit.

DESCRIPTION OF THE PREFERRED EMBODIMENTS

The description of the construction and functioning of the universal module of this invention will be presented as follows:

1. Description of the remote process control instrumentation to which the universal module may be connected.

2. Description of the construction of an electrical display station.

3. Description of the circuits of the universal module and components.

4. Description of embodiments of electrical display stations created by selectively connecting components 52a–e and embodiment selector jumpers 79 to the universal module.

1. Description of the remote process control instrumentation to which the universal module may be connected.

Figure 1:
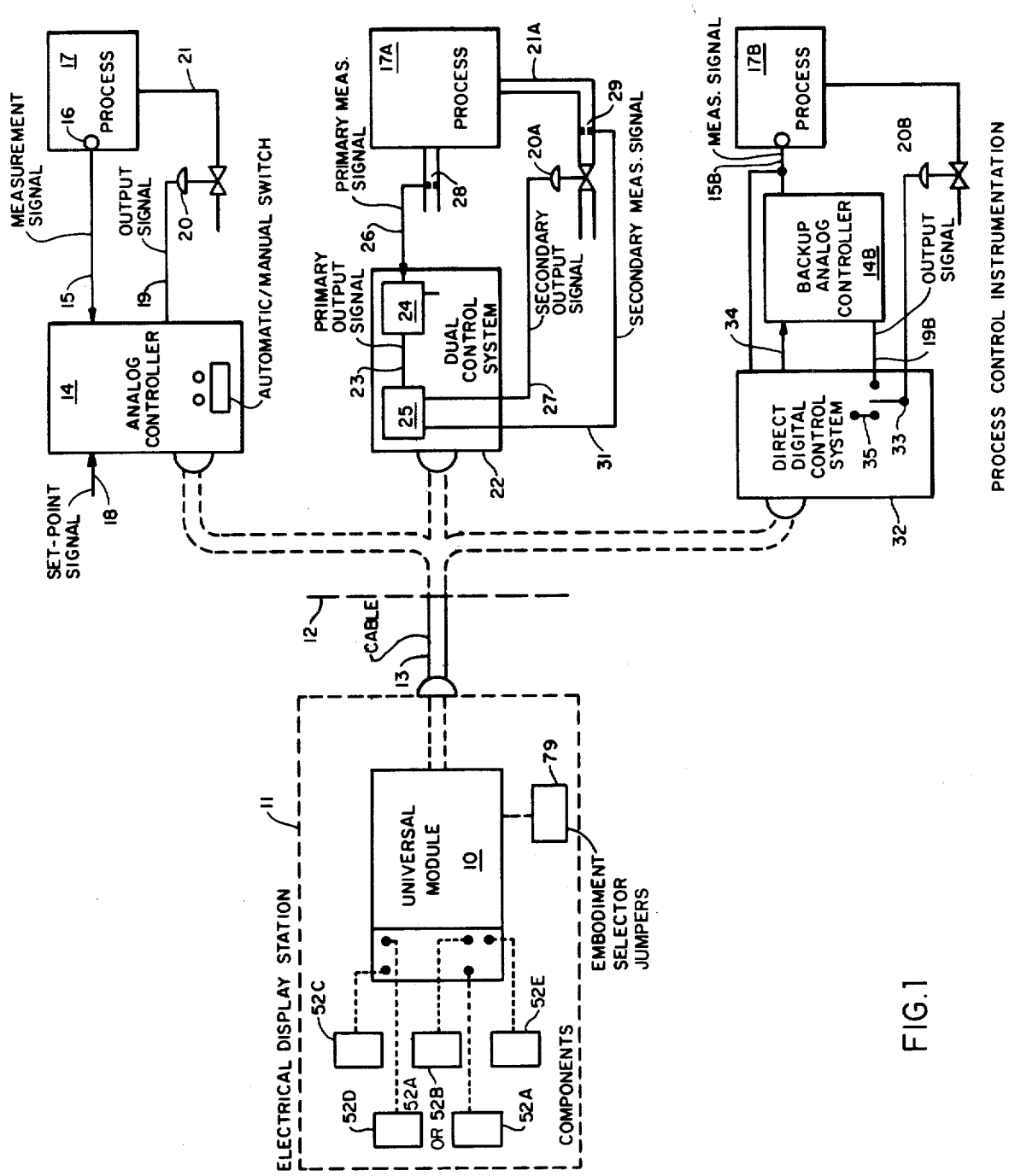
FIG. 1. A diagram illustrating the type of process control instrumentation which may be connected to the universal module of this invention.

FIG. 1 is a diagram to illustrate how the universal module 10 may be used as the basis for creating a complete line of embodiments of electrical display stations 11 which are capable of serving a wide variety of process control instrumentation as shown to the right of dotted line 12. The universal module 10 is connected to the process control instrumentation by a multiple conductor cable 13. In practice, cable 13 may have thirty-two individual conductors, each of which is assigned to transmit a designated signal so that the same cable may serve to connect the universal module 10 to any one of a variety of process control instrumentation.

Examples of the type of process control instrumentation are disclosed to the right of dotted line 12. Cable 13 is shown connected to analog controller 14 which receives a measurement signal 15 from a sensing element 16 in process 17. Analog controller 14 may receive a set-point signal from electrical display station 11 or may have a set-point signal 18 generated at analog controller 14. Analog controller 14 compares measurement signal 15 with the set-point signal received or set point signal 18 and produces an output signal 19 which is transmitted to valve 20 to regulate the flow of fluid through pipe 21 to process 17 to maintain the measurement signal at the set-point value. Analog controller 14 usually includes an auto/manual switch which enables the operating personnel to switch analog controller 14 between automatic and mannual modes of operation. In order that the operating personnel located at the electrical display station 11 may have available all of the information essential to the operation of analog controller 14 and be able to manipulate analog control 14, the measurement signal 15, controller output signal 19, set-point signal 18, and station signals indicating the mode of operation of analog controller 14 are transmitted through cable 13 to electrical display station 11 and signals originating at electrical display station 14 are transmitted back through cable 13 to analog controller 14.

Electrical display station 11 may be connected by cable 13 to a dual control system 22. A dual control system 22 is essentially two controllers similar to analog controller 14 with the output signal 23 of the primary controller 24 serving as the set-point signal for the secondary controller 25. Primary controller 24 receives a primary measurement signal 26 from a sensing element 28 related to process 17a and compares the primary measurement signal 26 with a primary set-point signal 30 to produce a primary output signal 23. In like manner, secondary controller 25 receives a secondary measurement signal 31 from sensing element 29 related to the process 17a and compares the secondary measurement signal 31 with the primary output signal 23 to produce a secondary output signal 27 which is transmitted to valve 20a to regulate the flow of fluid through pipe 21a to process 17a. In order that the operating personnel located at electrical display station 11 may have available all of the information essential to the operation of dual control system 22, primary measurement signal 26, secondary measurement signal 31, primary output signal 23, primary set-point signal 30 and station signals indicating the mode of operation of dual control system 22, are transmitted through cable 13 to electrical display station 11 and signals originating or modified at electrical display station 11 are transmitted back through cable 13 to dual control system 22.

The example just described in known as cascade control. A ratio control system is identical to a cascade control system except that the primary output signal is multiplied by a ratio signal and the resulting ratio output signal becomes the set-point signal for the secondary controller. When an embodiment of electrical display stations 11 is connected to a dual control system 22 for ratio control, the ratio signal and ratio output signal may be generated at the electrical display station 11.

Electrical display station 11 may be connected by cable 13 to a direct digital control system 32. The direct digital control system may require a backup analog controller 14b. Both direct digital control system 32 and backup analog controller 14b receive measurement signal 15b. Dual digital controller 32 generates a set-point tracking signal 34 which maintains the set-point signal of analog controller 14b at the current operating value. Direct digital controller 32 includes a transfer switch 33 which, upon failure of direct digital controller 32 switches from its output signal 35 to the output signal 19b from backup analog controller 14b. As in each of the above examples, all signals from direct digital control systems 32 and backup analog controller 14b are transmitted through cable 13 to electrical display station 11 and signals originating or modified at electrical display station 11 are transmitted back to direct digital control system 32 and backup analog controller 14b.

2. Description of the Construction of an Electrical Display Station

Figure 2:
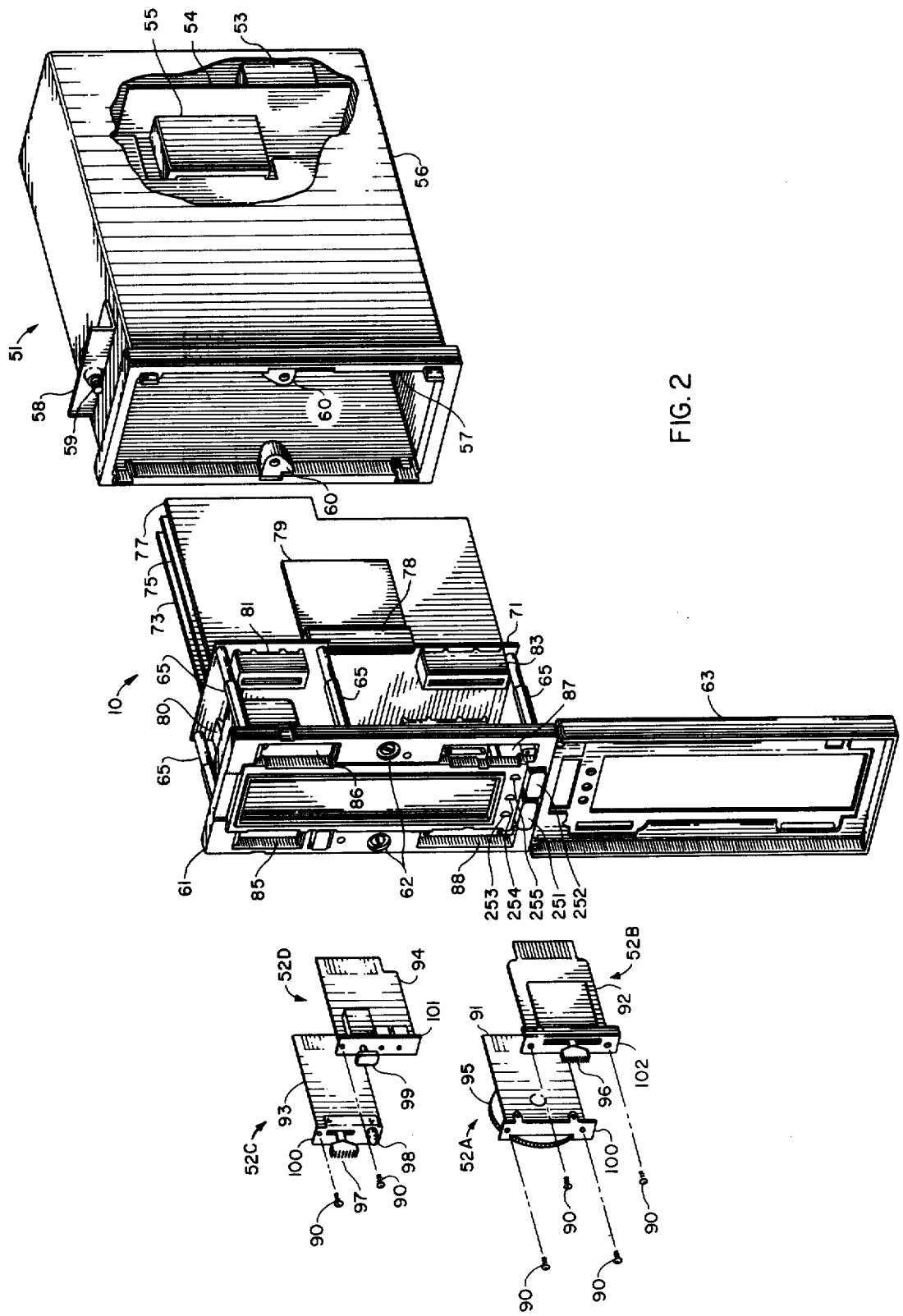
FIG. 2. A partially exploded drawing illustrating the construction of the electrical display station.

Referring to FIG. 2, an electrical display station is disclosed with the universal module 10 pulled out of case assembly 51 and with plug-in type of components 52a–52d, removed from the universal module 10. The multiple conductor cable 13 shown in FIG. 1 is connected to connector 53 mounted in the back of case assembly 51. The individual terminals of connector 53 are connected through circuit card 54 to edge type connector 55.

Casing assembly 51 includes housing 56 having a top mounting bracket 58 and screw 59. The casing assembly 51 is adapted to be mounted on a panel (not shown) by sliding housing 56 through an opening in the panel so that the back surface of front flange 57 abuts the front of the panel and casing assembly 51 is clamped in place by screw 59 abutting the back side of the panel. When universal module 10 is in operating position in case assembly 51, the back surface of front panel 61 engages the front surface of flange 57 and is held in place by screws 62 which project through front panel 61 to engage with theaded holes 60 in flange 57.

The universal module 10 includes a cover 63 which is shown in an open position to expose the front surface of front panel 61. The physical construction of the universal module is best shown by reference to FIGS. 2 and 3. Display mounting board 64 is mounted on the back surface of front panel 61 by post screw 65 with electrical display unit 66 connected thereto by plugging terminals 67 into connector 68 on display mounting board 64. Mounted on the back of display mounting board 64 is connector 69 which received edge engaging connector card 70. The other electrical elements and circuits on display mounting board 64 will be described later herein. Circuit mounting board 71 has mounted on the back surface thereof connectors 72, 74, 76 and 78 into which are plugged in edgewise engagement respectively micro-processor system card 73, display driver circuit card 75, input/output circuit card 77 and embodiment selector jumpers 79. The rear edge of input/output card 77 engages with connector 55 in the casing assembly 51 when the universal module 10 is inserted in the casing assembly 51 in operating positions. Plugged into the front surface of circuit mounting board 71 are connectors 80, 81, 82 and 83 so that when circuit mounting board 71 is attached to the front panel 61 and display mounting board 64 by post screws 64 and screws 84 the connectors line up respectively with openings 85, 86, 87 and 88 in front panel 61. Also plugged into the front surface of circuit mounting board 71 is connector 89 in a position so that when circuit mounting board 71 is assembled to display mounting board 65, connectors 69 and 89 are aligned and connector card 70 is plugged into each connector.

Figure 3:
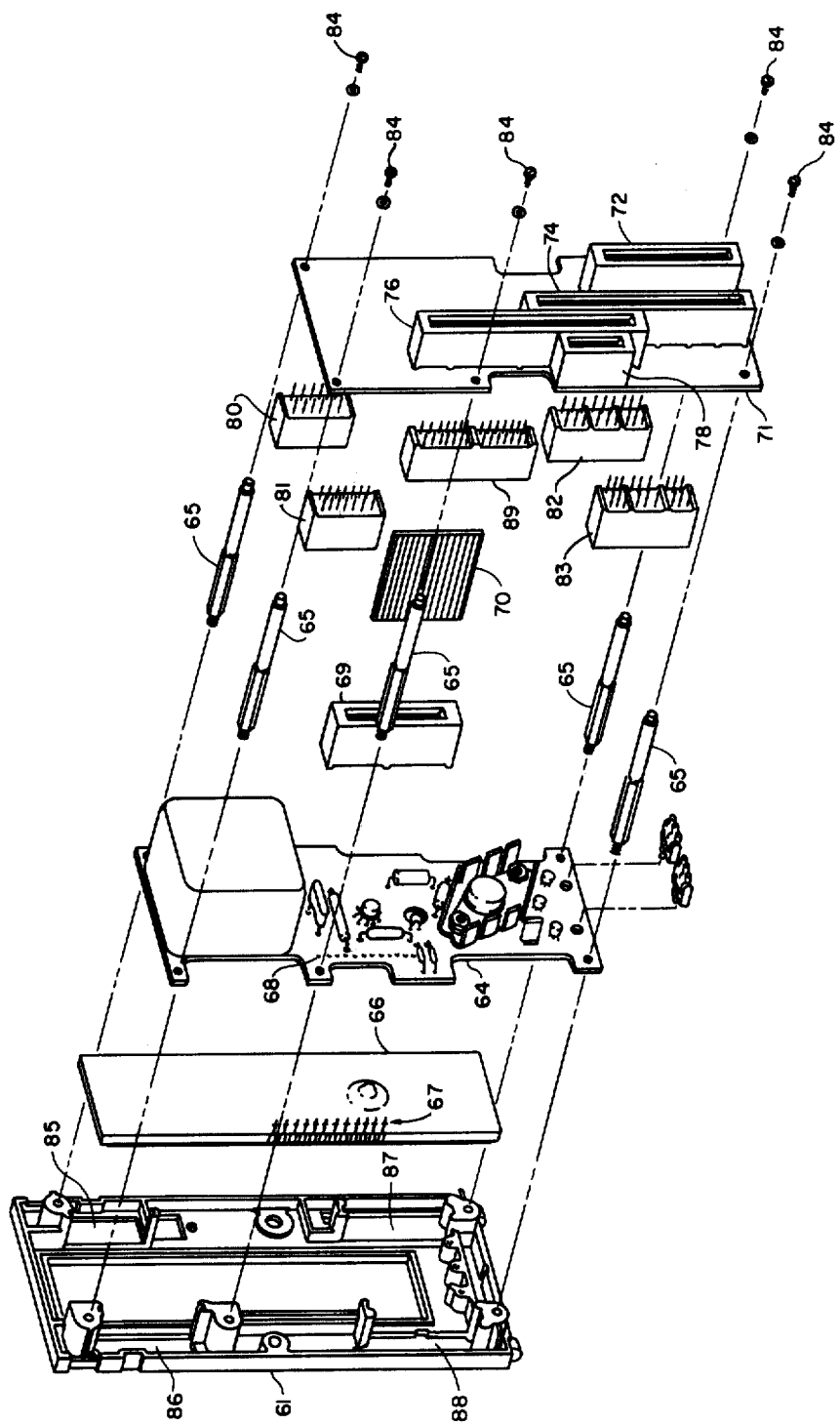
FIG. 3. An exploded drawing illustrating the construction of the universal module.

Referring to FIGS. 2 and 3, each embodiment of the electrical control station is created by selectively plugging into connectors 80-83 and 250 (FIG. 4) of the universal module 10 a combination of components 52a-3. The body for each component 52a-d is a printed circuit card 91-94 respectively which provides terminals on the back edge for selectively contacting terminals in connectors 80-83. The components selected and plugged into universal module 10 are held in place by screws 90.

3. Description of the Circuits of the Universal Module and Components

Figure 4A:
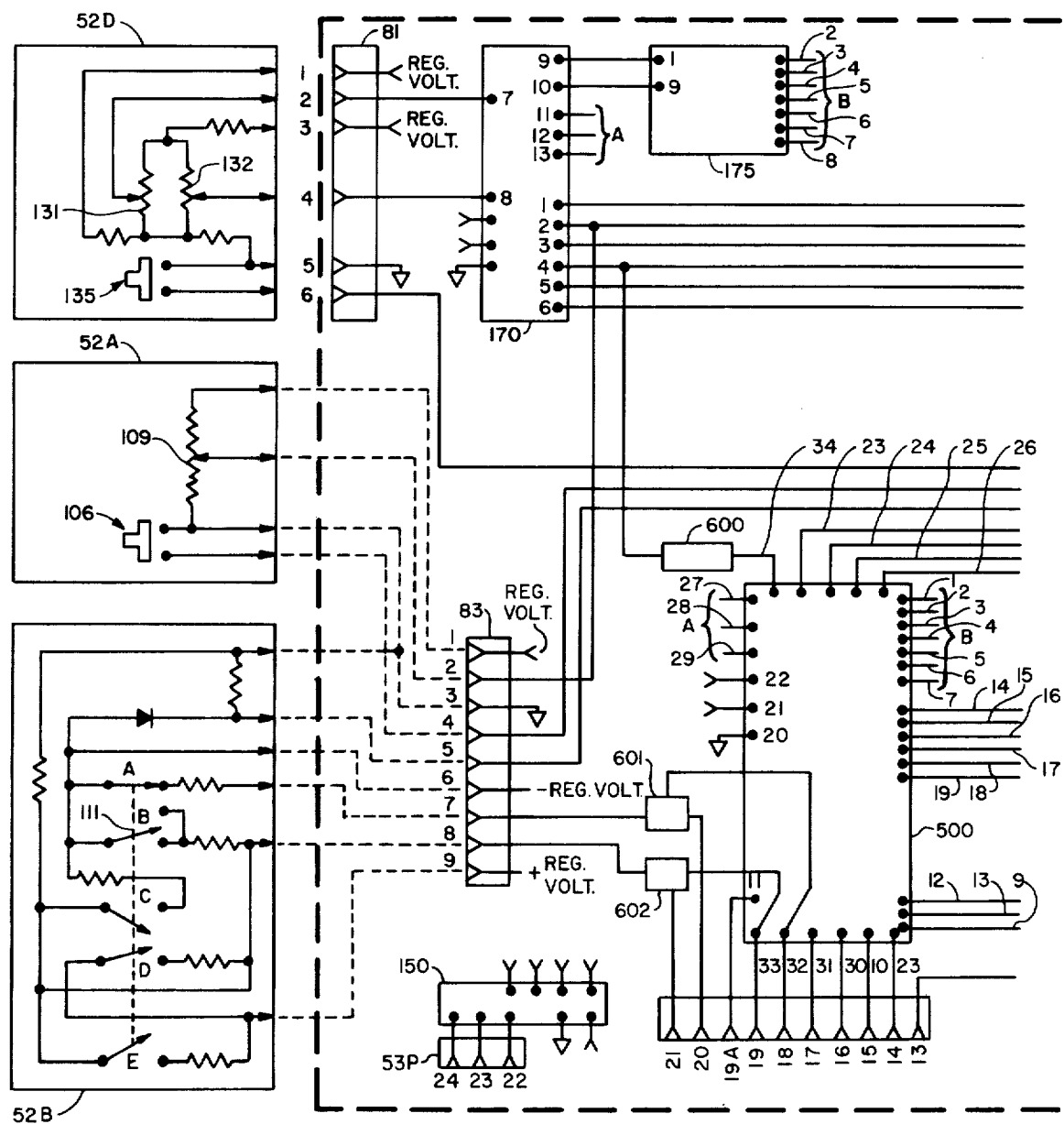
FIGS. 4a and 4b. A circuit diagram of the universal module and the components which may be connected thereto.
Figure 4B:
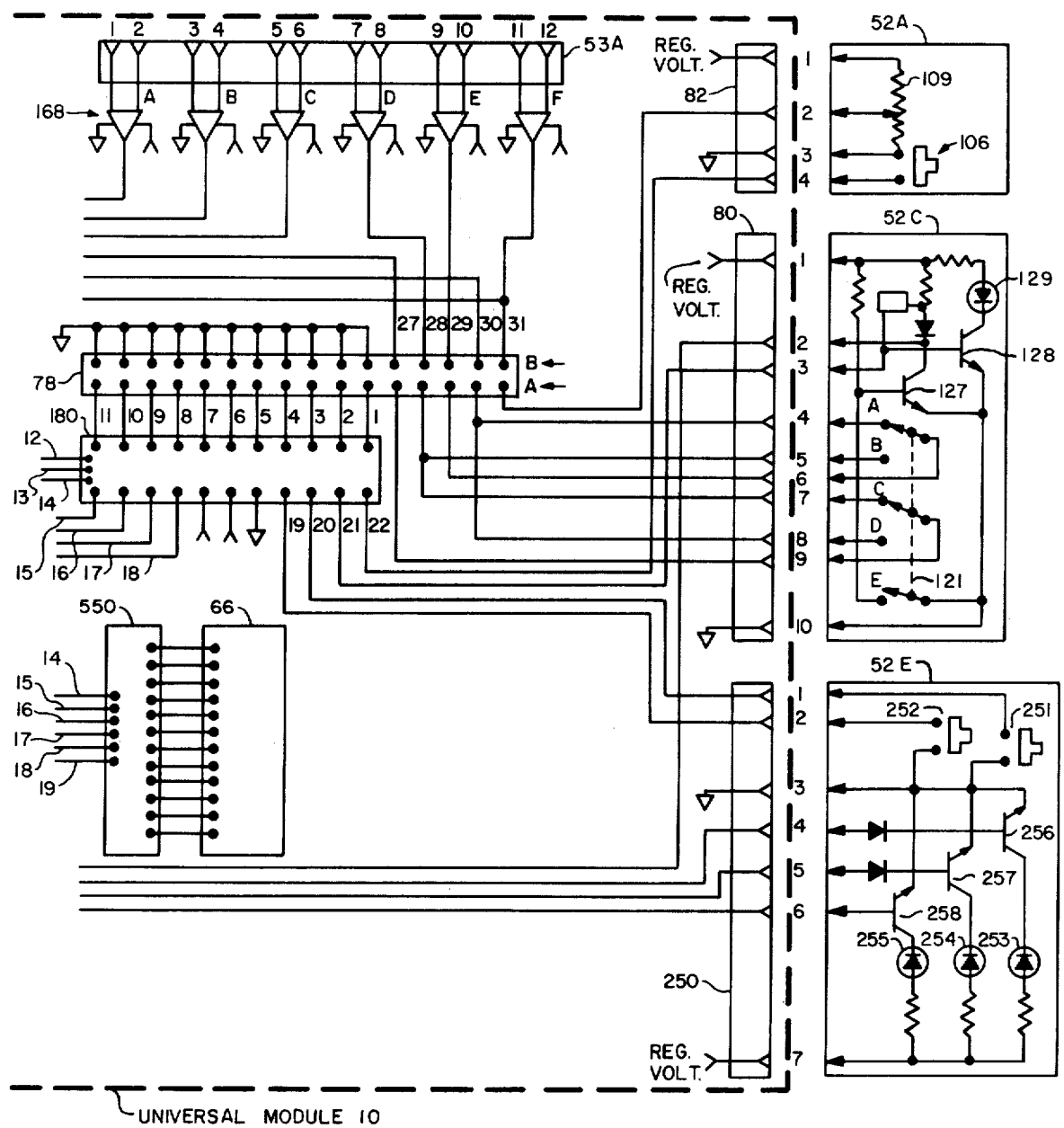

Referring to FIGS. 4a and 4b, the universal module 10 of this invention is shown as a block diagram inside the dotted lines and components 52a-e which may be selectively connected to universal module 10 to create embodiments of electrical display station 11 are shown as circuit diagrams outside the dotted line.

All signals to be received from or transmitted to process control instrumentation through multiple conductor cable 13 are fed through terminals 1-22 of connector 53 and power is fed through terminals 23-25 of connector 53. In FIGS. 4a and 4b connector 53 has been divided into three parts. All analog signals are assigned selectively to terminals 1-12 of connector part 53a. All digital signals are assigned selectively to terminals 13-21 of connector part 53d. Power is supplied to terminals 22-24 of connector part 53p.

Figure 5:
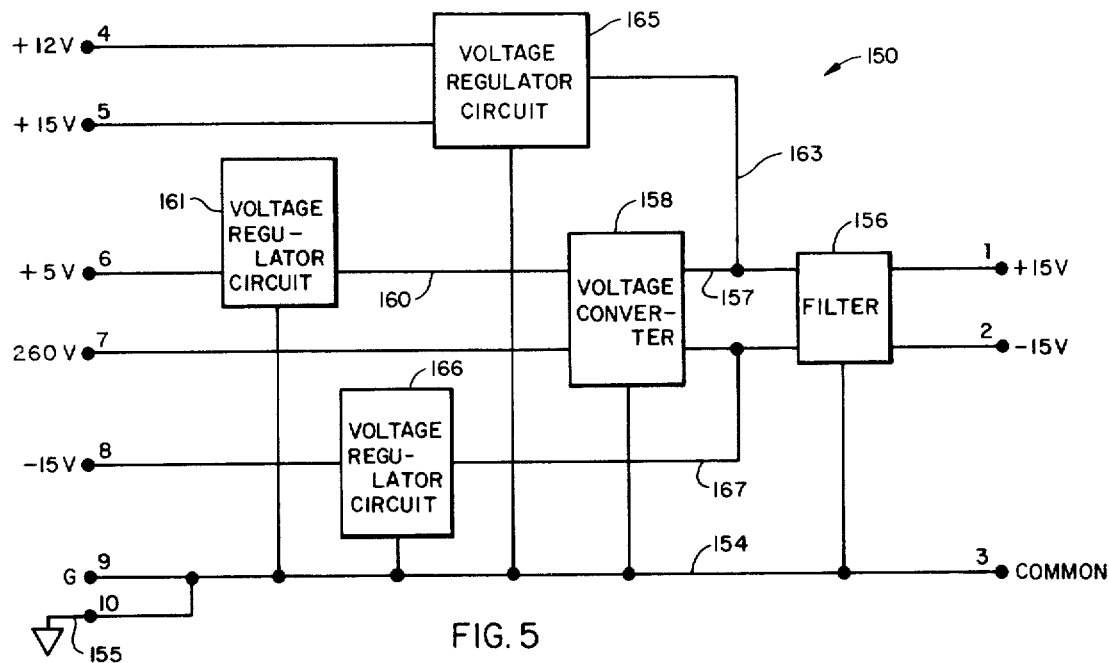
FIG. 5. A circuit diagram of the power supply circuit.

Referring to FIGS. 4a, 4b and 5, the power is supplied through terminals 22-24 of connector part 53p is fed to terminals 1-3 respectively of power supply circuit 150. Power supply circuit 150 is located on display mounting board 64. Direct current power may be supplied in the order of +15 volts between input terminals 1 and 3 and −15 volts between input terminals 2 and 3. The common input terminal 3 is connected by line 154 to output terminal 9 and through output terminal 10 to ground 155, which serves as a common ground for all circuits shown in FIGS. 4a and 4b. The conductive path in cable 13 through terminal 24 of connector part 53a is connected to the ground of the process control instrumentation. The direct current power received between input terminals 1 and 3 and between input terminals 2 and 3 is fed through filter 156. The filtered positive direct current is fed through line 157, direct current converter 158 to output terminal 7 to provide between output terminals 7 and 9 power having a voltage in the order of 260 volts for energizing electrical display unit 66. A second output from direct current converter 158 is fed through line 160 to voltage regulator circuit 161 to output terminal 6 to provide between output terminals 6 and 9 power having a regulated voltage in the order of +5 volts. The filtered positive direct current power is fed through line 163 and voltage regulator 165 to output terminal 5 to provide between output terminals 5 and 9 a regulated voltage in the order of +15 volts and to provide between output terminals 4 and 9 a regulated voltage in the order of +12 volts. The filtered negative direct current power is fed through line 167 and voltage regulator circuit 165 to output terminal 8 to provide between output terminals 8 and 9 a regulated voltage in the order of −15 volts. This power supply circuit 150 receives power from an outside source and provides a plurality of power circuits of the required voltage for the various individual circuits of module 10 and the selected components 52a-e which may be selectively connected to universal module 10 to create an embodiment of electrical display station 11.

Referring to FIGS. 4a and 4b, each analog signal transmitted through cable 13 to or from power process control instrumentation is transmitted through two conductive paths. Each pair of terminals 1-2, 3-4, 5-6, 7-8, 9-10, and 11-12 of connector part 53a is fed respectively to amplifiers 168a-f. Amplifiers 168a-f receive power from power supply 150, which provides a conductive path from its grounded output terminal 9 to the ground of the process control instrumentation so that amplifiers 168a-f provide the well known common mode rejection. Amplifiers 168a-c are connected respectively to terminal 1-3 of analog multiplexer 170. Amplifier 168f is connected to routing terminal 31b of embodiment selector connection 78 and to terminal 6 of analog multiplexer 170. Amplifiers 168a-f and analog multiplexer 170 are located on input/output circuit card 77.

Analog signals are generated in universal module 10 in cooperation with thumbwheel component 52a and alarm component 52d. Thumbwheel component 52a is adapted to be connected to eigher connector 82 or 83. Alarm component 52d is adapted to be connected to connector 81.

Referring to FIGS. 2, 4a and 4b, printed circuit card 91 serves as the body of thumbwheel component 52a. Thumbwheel 95 is rotatively mounted on printed circuit card 91 and when pressed inwardly, slides to actuate switch 106. Rotation of thumbwheel 95 moves a slider along resistance 109 mounted on printed circuit card 91. Leads are provided on printed circuit card 91 from the slider, resistance 109 and switch 106 which mate with terminals 1-4 of connectors 82 and 83. The edge of thumbwheel 95 extends beyond the front panel 100 to enable operating personnel to adjust the position of the slider along resistance 109. Thumbwheel component 52a is held in place by screws 90. When connected to either connector 82 or 83, a regulated voltage is supplied between terminals 1 and 3. The regulated voltage is reduced to a desired amplitude analog signal by rotating thumbwheel 95 to position the slider along resistance 109. When thumbwheel component 52a is connected to connector 83, the resulting analog signal generated at terminal 2 of connector 83 is transmitted to terminal 2 of analog multiplexer 170 and through amplifier 168b to terminals 3 and 4 of connector part 53a. Actuation of switch 106 grounds a digital signal which is transmitted through terminal 13 of digital multiplexer 180 to terminal 4 of connector 83. When thumbwheel component 52a is connected to connector 82, the resulting analog signal generated at terminal 2 of connector 82 is transmitted to routing terminal 31a of embodiment selector terminal 78, where it may be selectively routed for transmission in a manner to be described in relation to each embodiment which utilizes thumbwheel component 52a connected to connector 82.

Referring to FIGS. 2, 4a and 4b, printed circuit card 94 serves as the body for alarm component 52d. Mounted on printed circuit card 94 is front panel 101 with knob 99 of acknowledge switch protruding and the adjusting screw of adjustable resistances 131 and 132 exposed to enable operating personnel to actuate acknowledge switch 135 and adjust adjustable resistances 131 and 132. Leads are provided to connect acknowledge switch 135 and adjustable resistances 131 and 132 to terminals 1-6 on printed circuit board 94. Terminals 1-6 on printed circuit board 94 are spaced to mate with corresponding terminals 1-6 of connector 81. Alarm component 52d is held in place by screw 90.

When alarm component 52d is connected to connector 83, regulated voltage is received from power supply 150 between terminals 1 and 5 and a lower regulated voltage is received between terminals 3 and 5. The higher regulated voltage is reduced to a desired amplitude analog signal representative of the high alarm trip-point by manually positioning the slider along adjustable resistance 131. The resulting analog high alarm trip-point signal generated at terminal 2 of connector 81 is transmitted to terminal 7 of analog multiplexer 170. In like manner, the lower regulated voltage is reduced to a desired amplitude analog signal representative of the low alarm trip-point by manually positioning the slider along adjustable resistance 132. The resulting analog low alarm trip-point signal generated at terminal 4 of connector 81 is transmitted to terminal 8 of analog multiplexer 170. Actuation of acknowledge switch 135 changes the status of a digital signal transmitted through terminal 6 to terminal 12 of digital multiplexer 180.

Printed circuit card 92 serves as the body for drive component 52b. Mounted on printed circuit board 92 is front panel 102 with knob 96 of position swtich protruding. Leads are provided to connect a five position switch to terminals 3 and of connector 83. The protrusion of knob 96 enables operating personnel to actuate five position switch 111. Drive component 52b is held in place by screws 90. Drive component 52b is connected to connector 83 in those embodiments of electrical display station 11 which are created to be connected to an analog controller of the type which includes circuitry which enables operating personnel located at electrical display station 11 to manually adjust the amplitude of output signal 19 when analog controller 14 is in manual mode of operation. U.S. Pat. No. 3,895,280 issued on July 15, 1975 to Neal D. Peterson illustrates an analog controller which may be so adjusted.

The controller described in the patent is transferred between automatic and manual modes of operation by the manner in which two field effect transistors (FET) are gated and then provides for the manual adjustment of the output signal by passing a manual drive signal through a suitably gated third FET. In automatic mode of operation, a series FET gated to pass a deviation signal while a shunt FET and the manual drive FET are in a non-conductory condition. Thus gated, a deviation signal is passed to the input of an integrating amplifier. In manual mode, the series FET is in non-conductory condition, and the shunt FET and manual drive FET are gated such that the shunt FET passes the deviation signal to ground and the manual drive FET passes a manual drive signal to the input of the integrating amplifier. The integrating amplifier holds its output signal at the amplitude it was at the time the transfer was made from automatic to manual mode of operation. The output signal of the integrating amplifier may be increased or decreased from the amplitude at which it is being held by applying a manual drive signal to the input of the integrating amplifier. The rate at which the output signal changes is dependent on the amplitude of the manual drive signal, the amount the output signal changes is dependent on the length of time the manual drive signal is applied, and whether the output signal is increased or decreased is dependent on the polarity of the manual drive signal. When the controller is transferred from manual to automatic mode of operation, the output signal is ramped to the amplitude of the deviation signal.

Driver component 52b receives positive and negative regulated voltage between terminals 3 and 9 and 3 and 6 respectively from power supply circuit 150. An increase/decrease signal generated at terminal 5 of connector 83 is transmitted to terminal 14 of digital multiplexer 180 to provide micro-processor system 500 with the polarity of the regulated voltages so micro-processor system 500 will process analog signals received in the proper direction. In its mid position, five position switch 111 closes contact A to generate a manual off signal at terminal 7 of connector 83. When five position switch 111 is moved away from its central position, contact A is opened to generate a manual on signal at terminal 7 of connector 83. At its first downward position, five position switch 111 closes contacts B and D to generate a positive slow manual drive signal at terminal 8 of connector 83. At its second downward position, five position switch 111 closes contact E to generate a positive fast manual drive signal at terminal 8 of connector 83. At its first upward position, five position switch 111 closes contact B to generate a negative slow manual drive signal at terminal 8 of connector 83. At its second upward position, five position switch 111 closes contact C to generate a negative fast manual drive signal at terminal 8 of connector 83. In order that the manual on/off signals and manual drive signals may be transmitted to controller 14 only when controller 14 is in its manual mode of operation, the manual on/off signals from terminal 7 of connector 83 are transmitted through gating circuit 601 to terminal 20 of connector part 53d and manual drive signals from terminal 8 of connector 83 are transmitted through gating circuit 602 to terminal 21 of connector part 53d. As will be explained later herein, micro-processor system 500 produces a series FET signal at terminal 32 and a shunt FET signal at terminal 33 which transfer controller 14 between automatic and manual modes of operation. The series FET signal from terminal 32 of micro-processor system 500 is transmitted to gating circuit 601 to pass the manual on/off signal to terminal 20 of connector part 53d only when controller 14 is in its manual mode of operation and the manual on signal gates the manual drive FET of controller 14 to pass the manual drive signal transmitted from terminal 21 of connector part 53d. In like manner, the shunt FET signal from terminal 33 of micro-processor system 500 is transmitted to gating circuit 602 to pass the manual drive signal to terminal 21 of connector part 53d only when the shunt FET of controller 14 is conditioned not to pass the deviation signal to the integrating amplifier.

Printed circuit card 93 serves as the body for switch component 52c. Two position switch 121, status indicator 129, transistors 127 and 128 and resistances 131 and 132 are mounted on printed circuit card 93. Locks are provided to connect the elements mounted on printed circuit card 93 to terminals of connector 80. Knob 97 of two position switch 121 projects outwardly from front panel 103 to enable operating personnel to actuate two position switch 121. Switch component 52c is held in place by screws 90. Switch component 52c is connected to connector 80 to create embodiments of electrical display station 11 which provides switching between two sets of analog signals to make available to operating personnel at electrical display station 11 selectively either set of analog signals and the information pertinent to making adjustments in one or more of the analog signals. Two position switch 121 is arranged so that when moved in an upward direction by actuation of knob 97, contacts A and C are closed and when moved in a downward direction, contacts B, D and E are closed. When in the upward position, a first circuit is completed from terminal 30a of embodiment selector connector 78 through terminals 4 and 6 of switch component 52c to terminal 29a of embodiment selector connector 78. Also a second circuit is completed from terminal 28a of embodiment selector connector 78 through terminals 7 and 9 of switch component 52c to terminal 27a of embodiment selector connector 78. When in the downward position, a first circuit is completed from terminal 28a through terminals 5 and 6 of switch component 52c to terminal 29c of embodiment selector connector 78. A second circuit is completed from terminal 30a through terminal 8 and 9 of switch component 52 to terminal 27a of embodiment selector connector 78. Thus the following are the paths of the signals reserved at terminals 30a and 28a:

switch 121 in upward position
30a - 4 and 6 - 29a
28a - 7 and 9 - 27a
switch 121 in downward position
30a - 8 and 9 - 27a
28a - 5 and 6 - 29a In switch component 52c, regulated voltage from power supply circuit 150 is received between terminal 1 and terminal 10 of connector 80. When switch 121 is in its downward position, contact E is closed, producing a gating signal which causes current to flow through transistor 127. This current flow produces a second gating signal which causes current to flow through transistor 128 to eliminate status indicator 129. The second gating signal is also transmitted through terminal 3 of connector 80 to terminal 21 of digital multiplexer 180 for processing through micro-processor system 500. The flow of current through transistor 127 also produces a status signal which is transmitted through terminal 2 of connector 80 to terminal 13 of terminal part 53d. The status signal serves to close a contact in a relay located at dual control system 22 to connect electrical display station 11 to the system common.

In order to maintain a constant analog output signal at terminals 9 and 10 of connector part 53a that might otherwise be interrupted by actuation of switch 121, sample and hold circuit 600 is connected to terminals 9 and 10 through routing terminals 27a and 29a of embodiment selector connector 78. Sample and hold circuit is controlled by an output signal received from terminal 34 of micro-processor system 500. The output signal is the result of routines activated by embodiment selector jumper 79 for those embodiments of electrical display station 11 which include switch component 52c.

Referring again to U.S. Pat. No. 3,895,280, the type of control circuit disclosed therein may be transferred between automatic and manual modes of operation without causing a sudden change in the output signal. However, a step change in the setpoint signal when the controller is in the automatic mode of operation will cause a sudden change in the output signal, but not when the controller is in the manual mode of operation. It is an important feature of this invention that embodiment selector jumpers 79 provide a routine for those embodiments of electrical display stations 11 which include switch component 52c which produces signals to the series and shunt FETS which transfer the controller to the manual mode for a short finite period of time at such time as switch 121 is actuated while controller is in the automatic mode.

Mode component 52e is connected to connector 250 in those embodiments of electrical display station 11 which are intended to be connected to process control instrumentation of the type that can be remotely switched from one mode of operation to another mode. For the convenience of operating personnel, A/M mode switch 251, Computer mode switch 252, automatic mode status indicator 253, manual mode status indicator 254 and computer mode status indicator 255 are located on the front of cover 63 as shown in FIGS. 2, 9a, 9b and 9c. Referring to FIGS. 4a and 4b, regulated voltage is received between terminal 7 and terminal 3.

Assuming that controllers 14, 14b or 25 is in its automatic mode of operation, actuation of A/M mode switch 251 generates a mode transfer signal which is transmitted through terminal 1 of connector 250 to terminal 20 of digital multiplexer 180. The mode transfer signal is processed by micro-processor system 500 to produce a series FET gating signal and a shunt FET gating signal at its terminals 32 and 33 respectively. The series FET gating signal and the shunt FET gating signal are transmitted through terminals 18 and 19 of connector part 53d to the controller to transfer it from its automatic mode of operation to its manual mode. Micro-processor system 500 also produces a manual bus signal at its terminal 31 which is transmitted through terminal 17 of connector part 53d to the controller. If the controller is being controlled by electrical display station 11, the manual bus signal so indicates at micro-processor system 500 and a manual status signal is produced at its terminal 12. The manual status signal is transmitted through terminal 5 of connector 250 to the base of transistor 257 to cause manual status indicator 254 to be illuminated. When A/M mode switch 251 is next actuated, the mode transfer signal generated is processed by micro-processor system 500 to change the series FET signal and the shunt FET signal so that the controller is transferred to its automatic mode of operation. Micro-processor system 500 also produces an automatic bus signal at its terminal 30 which is transmitted through terminal 16 of connector part 53d to the controller. If the controller is being controlled by the electrical display station 11, the automatic bus signal so indicates at micro-processor system 500 and an automatic status signal is produced at its terminal 13. The automatic signal is transmitted through terminal 4 of connector 250 to the base of transistor 253 to cause automatic status indicator to be illuminated.

When computer mode switch 252 is actuated, a mode transfer signal is generated which is transmitted through terminal 2 of connector 250 to terminal 19 of digital multiplexer 180. The mode transfer signal is processed by micro-processor system 500 to produce a computer on-off signal at its terminal 10 and a computer status signal at its terminal 9. The computer on-off signal is transmitted through terminal 15 of connector part 53d to the direct digital control system 32 and transfers from either automatic or manual mode of operation of back-up controller 14b to the computer mode of operation. The computer status signal produced at terminal 9 is transmitted through terminal 6 of connector 250 to the base of transistor 258 to cause computer status indicator 255 to be illuminated.

The analog signals received at terminals 1-8 of analog multiplexer 170 are scanned and each analog signal is sequentially connected to terminal 9 for transmittal to input terminal 1 of converter 175 which converts the analog signal to a parallel digital signal for transmission through cable B to terminals 1-7 of micro-processor system 500. When micro-processor system 500 processes a signal which is to be converted to an analog signal, a parallel digital signal is transmitted through cable B to converter 175, which converts the parallel digital signal to an analog signal for transmission from terminal 9 to terminal 10 of analog multiplexer 170 for selective transmission from one of terminals 1-6. Converter 175 is located an input/output card 77.

Figure 6:
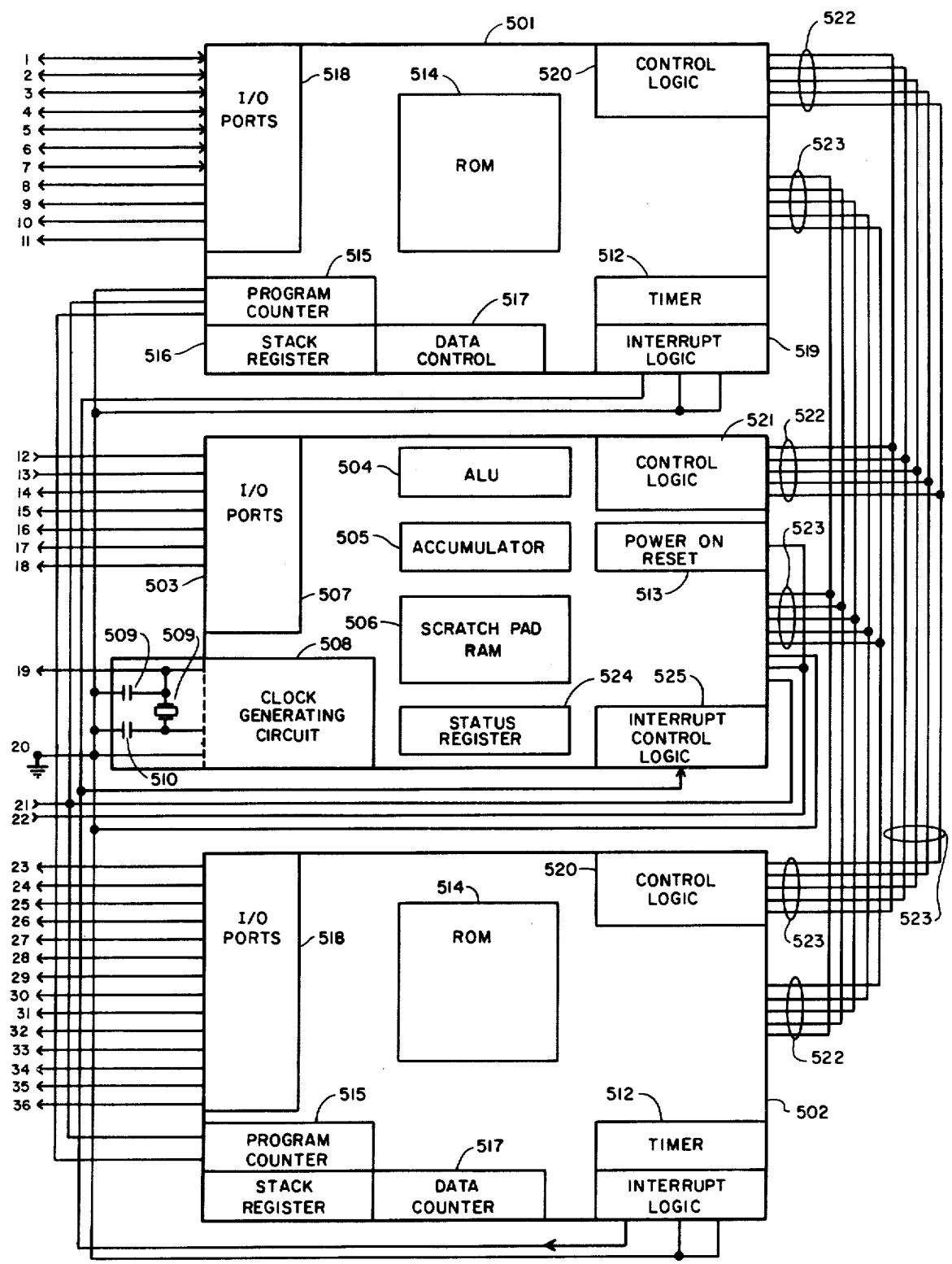
FIG. 6. A circuit diagram of the micro-processor system.

FIG. 6 shows a circuit diagram of micro-processor system 500 which is located on micro-processor system card 73. Micro-processor system 500 includes program storage units 501 and 502 and central processing unit 503. If the capacity of program storage units 501 and 502 is not sufficient to meet the needs of a line of electrical display stations 11, additional units may be added.

Program storage units 501 and 502 have stored therein non-volatile programs with an address assigned for each routine to be performed for an embodiment and selectable sub-routines, and all constants required in any calculation to be performed by central processing unit 503. Program storage units 501 and 502 include circuits which function as follows:

ROM 514 provides for read only memory program storage;

program counter 515 contains the address of the next instruction type to be fetched from memory and is automatically incremented after each fetch cycle is executed;

stack register 516 receives the contents of program storage counter 515 whenever an interrupt is generated or when the program counter is pushed to stack register 516 and also aids in developing a multiple level program function;

Data counter 517 is used for referencing memory addresses;

I/O ports 518 are bidirectional;

Interrupt logic 519 provides the next instruction address when interrupt occurs;

timer 512 performs normal routing tasks such as keeping track of elapsed time as data is transmitted to external circuits, automatically initiates the next operation at the end of transmission and the like.

Central processing unit 503 is used for controlling the functions of micro-processor system 500 briefly as follows:

arithmetic logic unit 504 is a parallel network and is adapted for binary or decimal functions and to handle instructions;

accumulator 505 is a storage register for storing the results of arithmetic operations and transferring information into and out of scratch pad memory 506;

status register 524 is provided to store the status indications from an arithmetic or logic program;

bidirectional input/output path 507 are provided for either gathering data from external circuits or for outputting data from other circuits;

clock generating circuit 508 is for generating the necessary two-phase clock signals used by central processing unit 503. The reference frequency of the two phase clock signals is controlled by crystal 509 and capacitor 510 and 511. In addition to supplying the two phase signals for the operation of the central processing unit 507, the frequency generated is supplied through output terminal 19 to display driver circuit 550.

Interrupt control logic 524 can be interrupted by timers 512 in program storage units 501 and 502;

Power-on reset 513 causes the central processing unit 503 to disable the interrupt system and insures that processing starts out from address zero when power is first applied to terminals 26 and 27.

Control logic 520 of program storage units 501 and 502 and control logic 521 of central processing unit 503 are interconnected by lines 552. The digital outputs are transmitted between program storage units 501 and 502 and central processing unit 503 through lines 523. The digital signals are received from or transmitted to external circuits through I/O ports 518 of program storage units 501 and 502 and I/O ports 557 of central processing unit 503. The I/O ports 507 and 518 are shown numbered from 1-36.

Figure 7:
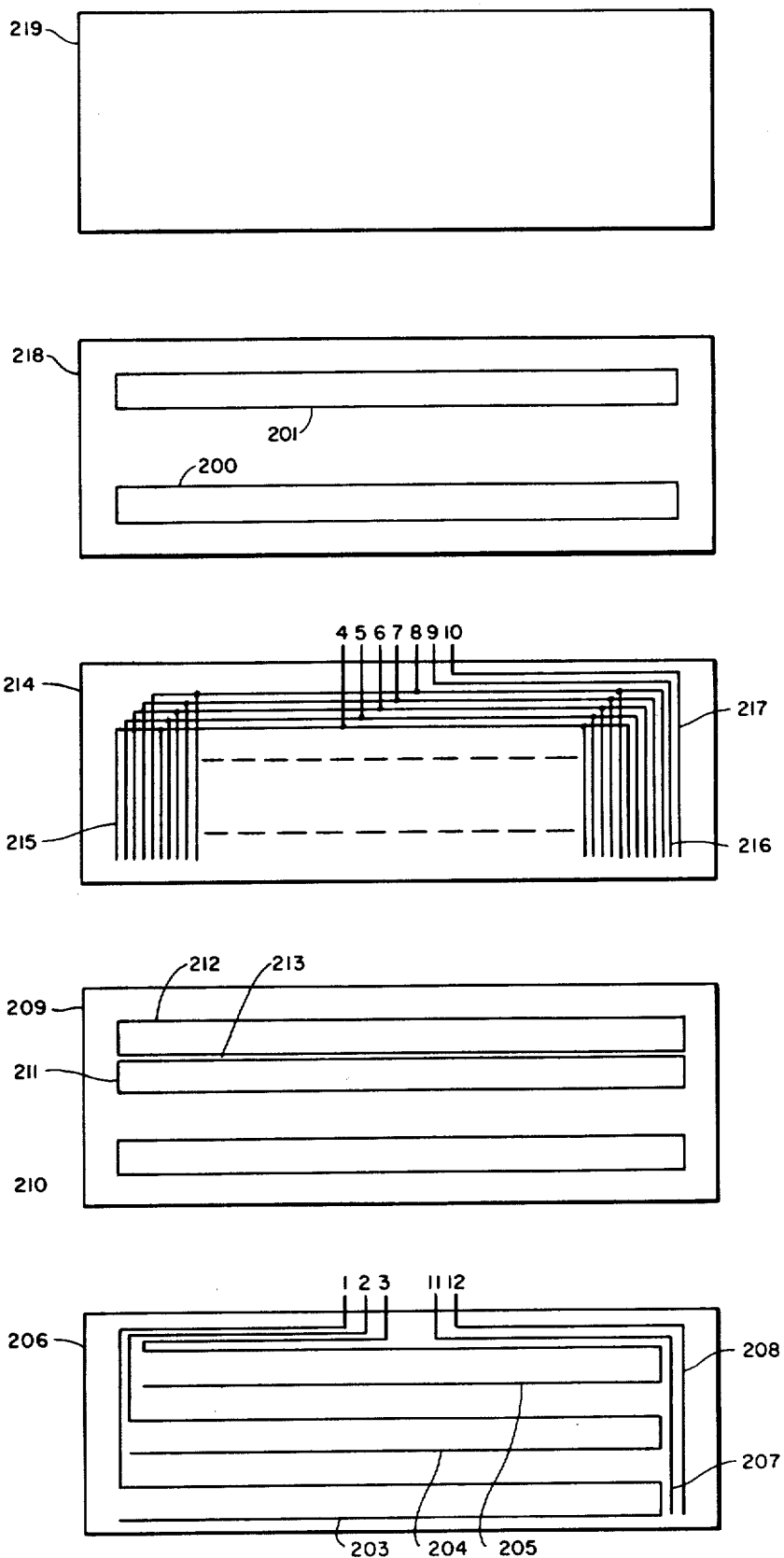
FIG. 7. An exploded drawing illustrating the construction of the electrical display unit.

FIG. 7 shows an exploded view of the construction of electrical display unit 66. Electrical display unit 66 is shown as a gaseous discharge type of unit having two bar graph panels 200 and 201 in which the amplitude of signals may be displayed in various modes. Electrical display unit 66 is constructed by depositing materials in successive layers on a glass substrate plate 206 and covering the laminated structure with a glass plate 219. The voids provided between glass substrate plate 206 and glass plate 219 are filled with an ionizable gas and then hermetically sealed. Left anode 203, scan anode 204 and right anode 205 are deposited on glass substrate 206 to provide three elongated U-shaped anodes. A short distance from the ends of the left, scan and right anodes 203, 204 and 205 is deposited a reset anode 207 which extends across left, scan and right anodes 203, 204 and 205. A short distance from reset anode 207 and parallel thereto is deposited keep-alive anode 208.

Leads connected to each anode 203, 204, 205, 207 and 208 are connected respectively to pins 1, 2, 3, 11 and 12 which extend beyond the edge of ceramic substrate plate 206 to provide, together with other pins which will be described hereinbelow, a plug-in type of connector for plugging into connector 68 located on daughter board 64. Next, a dielectric separator 209 is deposited over the entire surface of glass substrate plate 206 and anodes 203, 204, 205, 207 and 208 and the leads to pins 1, 2, 3, 11 and 12, except for slots 210, 211 and 212 which leave exposed the area directly over left anode 203, scan anode 204 and right anode 205 and extends over reset anode 207 and keep-alive anode 208. A barrier strip 213 is deposited between slots 211 and 212 in a manner which provides sufficient space for charged particles to pass therethrough. A cathode ladder 215 comprising a series of accurately spaced parallel cathodes is deposited on the underside of dielectric sheet 214. A short distance below the last of cathode of cathode ladder 215 is deposited a reset cathode 216. A short distance below reset cathode 216 is deposed keep-alive cathode 217. When dielectric sheet 214 is mounted on dielectric separator 209, cathode ladder 215, reset cathode 216 and keep-alive cathode 217 extend across left, scan and right anodes 203, 204 and 205, and are spaced therefrom by the thickness of dielectric separator 209. Each cathode of cathode ladder 215 is sequentially connected to every fifth cathode directly above it and leads to the five connections are connected respectively to pins 4-8. Leads from reset cathode 126 and keep-alive cathode 217 are connected respective to pins 9 and 10. Pins 4-10 extend beyond the edge of ceramic substrate plate 206 for plug-in connection to connector 68 of daughter board 64.

The laminated structure is completed by depositing mask 218 and sealing glass plate 219 in place. Mask 218 has two bar graph panels 200 and 201 providing openings respectively over left anode 203 and right anode 205 for viewing the display of the amplitude of signals thereon. The assembly of electrical display unit 66 is then filled with an ionizable gas and sealed.

In order to meet the requirement for commercial accuracy of ½ per cent of full scale, 208 cathodes in cathode ladder 215 are provided, of which 200 cathodes represent 100 percent of full scale and a number of cathodes at each end of the scale permit displaying the amplitude over or under full scale.

In operation, a potential is applied between keep-alive anode 208 and keep-alive cathode 126 to establish a glow discharge in the vicinity of keep-alive cathode 216. When it is desired to display the amplitude of a signal on left bar graph panel 200, the glow is transferred from the vicinity of reset cathode 216 by applying a potential between reset anode 207 and reset cathode 217. Then the glow is sequentially transferred from the first of cathodes of cathode ladder 215 upwardly to the cathode height desired by sequentially applying a potential between individual cathodes of cathode ladder 215 and left anode 203. The operation of the ladder segment over scan anode 204 is similar except that the potential is sequentially applied between individual cathodes of cathode ladder 215 up to the uppermost cathode. The operation of right bar graph panel 201 is based upon the principle set forth in U.S. Pat. No. Re. 28,683. The glow for right bar graph panel 201 is achieved by transferring the glow sidewise from the hidden segment by applying a potential between selected individual cathodes of cathode ladder 215, and right anode 205. By selectively applying the potential to selective individual cathodes of cathode ladder 215 and right anode 205 various modes of displaying the amplitude of a signal are possible, as will be explained later herein.

Referring to FIG. 8, a display driver circuits 550, located on display driver circuit card 75, receives all input signals from micro-processor system 500 and all operaing power from power supply circuit 150 and transmits all output signals to electrical display unit 66. In order to simplify the tracing of electrical paths, all input terminals of display driver circuit are numbered the same on the terminal of micro-processor system 500 from which the signal is transmitted. Also, all output terminals of display driver circuit 550 are numbered the same as the pin on electrical display unit 66 to which the output is transmitted.

The reference frequency is received from microprocessor system 500 at input terminal 19 which in turn is fed to brightness control circuit element 551 which either transmits the reference frequency or transmits a reduced frequency to frequency divider circuit 552. The reduced frequency may be a frequency which is one half of the reference frequency. Brightness control circuit element 551 reduces the reference frequency when it receives a brightness control signal from input terminal 16 through NAND gate 553. NAND gate 553 transmits the brightness control signal to brightness control circuit element 551 when it simultaneously receives brightness control signal from input terminal 16 and right anode control signal from input terminal 14. As described, the brightness of right segment 201 is controlled. The brightness of the display on bar graph panels 200 or 201 of electrical display unit 66 is a function of the length of time a potential is applied between a cathode and an anode. By reducing the frequency, the length of time is increased so that the display is rendered brighter. The brightness control may be applied in many modes of displaying a signal. One example is to display two signals alternately in rapid succession on one segment, using the brightness control to render the display of one signal brighter than the display of other signals so the signals may be easily distinguished from each other. Another example is displaying a signal in a pointer mode wherein the pointer is produced by applying a potential sequentially to only four selected cathodes.

Frequency divider circuit 552 reduces the frequency to a suitable frequency for operating five phase scanning circuit 554, as for example, by dividing the receiver frequency by a factor of 80. In turn, five phase scanning circuit 554 provides five phase output pulses to electrical display unit 66 through output terminals 4-8.

A potential is constantly applied between keep-alive anode and keep-alive cathode 217 through output terminals 10 and 11, with power supplied through resistor 555 and grounded through resistor 556.

A reset signal received from micro-processor system 500 at input terminal 17 is fed to reset cathode control circuit element 557 and reset anode control circuit element 558 to apply a potential between reset cathode 216 and reset anode 207 and thus transfer glow from the vicinity of keep-alive cathode 217 to the vicinity of reset cathode 216 to prepare for the initiation of a scanning cycle of cathode ladder 215. The reset signal is fed through NAND gate 559 to the base of transistor 560 in reset cathode control circuit 557 to control the potential at output terminal 9. The reset signal from NAND gate 559 is also fed to control transistor 561 which in turn gates a potential through power transistor 562 to output terminal 12. The reset signal is also fed to one terminal of NAND gate 563 in start/stop control circuit 564 and thence through flip-flop circuit 565, NAND gate 566 and NAND gate 567 to control transistor 568 in scan mode control circuit 569 which, in turn gates a potential through power transistor 570 to output terminal 2.

After the reset signal has been received at input terminal 17 and a glow is transferred to the vicinity of reset cathode 216, then a start signal received from input terminal 18 by five phase scanning circuit 554 initiates the scanning cycle of cathode ladder 215. In five phase scanning circuit 534, the start signal is fed to NAND gate 571 which feeds the frequency signal from frequency dividing circuit 552 to counter 572. Counter 572 produces output signals sequentially at each of five output terminals and continues to produce such output signals until a stop signal is received at terminal 18. The five output signals from counter 572 are fed to a power gating circuit 573 which gates power sequentially to output terminals 4-8.

In the operation of display driver circuit 550 thus far described, a potential is applied between scan anode 204 and sequentially connected individual cathodes of cathode ladder 215 so that the glow is transferred during each scan cycle from reset cathode 216 to the uppermost cathode of cathode ladder 215. In order to accomplish this result, the start signal received through input terminal 18 triggers flip-flop 565 in start/stop control circuit 564 to fed a control signal through NAND gates 566 and 567 to scan mode control circuit element 569. The control signal remains on until the stop signal is received from five phase scanning circuit 554 by NAND gate 563. The stop signal triggers flip-flop 565 to turn off the control signal and thus turn off the potential between scan anode 204 and cathodes 216.

The right anode control signal received from microprocessor system 500 at input terminal 14 is fed through NAND gate 574 to control transistor 575 in right anode control circuit element 576, which in turn gates a potential through power transistor 577 to output terminal 3. In operation, a potential is applied between right anode 205 and sequentially connected cathodes of cathodes ladder 215 so that the glow is transferred from the vicinity of scan anode 204 to the vicinity of right anode 205 and selected individual cathodes of cathode ladder 215. The right anode control signal is coordinated with the scaling of cathode ladder 215 so that it is in an on condition only at the time the selected cathodes are being scanned so that the glow appears only in the vicinity of these selected cathodes.

The left anode control signal received from microprocessor system 500 at input terminal 15 is fed through NAND gate 577 to control transistor 578 in left anode control circuit element 579, which in turn gates a potential through power transistor 580 to output terminal 1. In operation, a potential is applied between left anode 203 and sequentially connected cathodes of cathode ladder 215 so that the glow is transferred from the vicinity of reset cathode 216 upwardly only so long as the left anode control signal is received at input terminal 15. Thus, the amplitude of a signal is controlled by the presence of the left anode control signal at input terminal 15.

Referring to FIGS. 4a and 4b, embodiment selector connector 78 has terminals 1a-11a and 1b-11b arranged so that a circuit between selected terminals 1a-11a and 1b-11b may be completed by either the use of digital switches or by insertion of embodiment selector jumpers 79 into embodiment selector connector 78,. Terminals 1a-11a are connected respectively to corresponding terminal 1-11 of digital multiplexer 180. Terminals 1b-11b are connected to ground terminal 9 of power supply circuit 150. In addition, re-routing terminals 27a, 27b, 28a, 28b, 29a, 29b, 30a, 30b, 31a and 31b are provided. Each embodiment selector jumper 79 provides the connection for routing analog signals in a manner that will be described in relation to each embodiment of electrical display station 11. Terminals 1a-5a are arranged to activate the address in micro-processor system 500 assigned to each embodiment of electrical display station 11. Terminals 6a and 7a are arranged to activate the sub-routine in micro-processor system 500 assigned to each type of alarm mode available for embodiments of electrical display stations 11 which include alarm component 52d. Terminals 8a and 9a are arranged to activate the sub-routines assigned to select the desired alarm cut-off point; that is the difference in amplitude of the alarm trip-point and the point at which the alarm signal is shut off. Terminals 10a and 11a are arranged to activate sub-routines assigned to select the desired range of analog ratio signals used in embodiments of electrical display station 11 use for ratio type of process control instrumentation. The selection of the alarm cut-off points and range of ratio may be accomplished by providing embodiment selector jumper 79 which selectively connect terminals of embodiment selector connector 78.

It is obvious from the above description of embodiment selector connector 78 that it is possible to activate many addresses and sub-routines from the number of terminals provided. It is well within the ability of one having oridinary skill in the art to determine the selection of the combination of jumper connections in order to activate selectively any address, sub-routine or routing of analog signals to specific terminals.

4. Description of embodiments of electrical display station created by selectively connecting components 52a–e and embodiment selector jumpers 79 to universal module.

The addresses for embodiments of electrical display stations 11 include routines and sub-routines common to more than one embodiment. The embodiments will be described in such an order that the routine and sub-routine of embodiments first described will apply to those later described.

Embodiment A is a single indicating electrical display station which receives an analog signal at terminals 1 and 2 of connector part 53a, such as analog measurement signal 15 from analog controller 14 and displays the amplitude of that signal as a bar graph on left bar graph panel 200. Embodiment A is created by connecting embodiment selector jumpers 79A to embodiment selector connector 78 to activate the address in microprocessor system 500 for the routines required to produce the control signals for transmission to the control elements in display driver circuit 550. The routines are selected to display the amplitude of anlaog measurement signal 15 as a bar graph extending from the bottom of the scale upward to the point on the scale representative of the amplitude of analog measurement signal 15 as display 225 in FIG. 9b. Hereinafter a display of this type will be referred to as a positive mode bar graph.

Figures 9A, 9B, 9C:
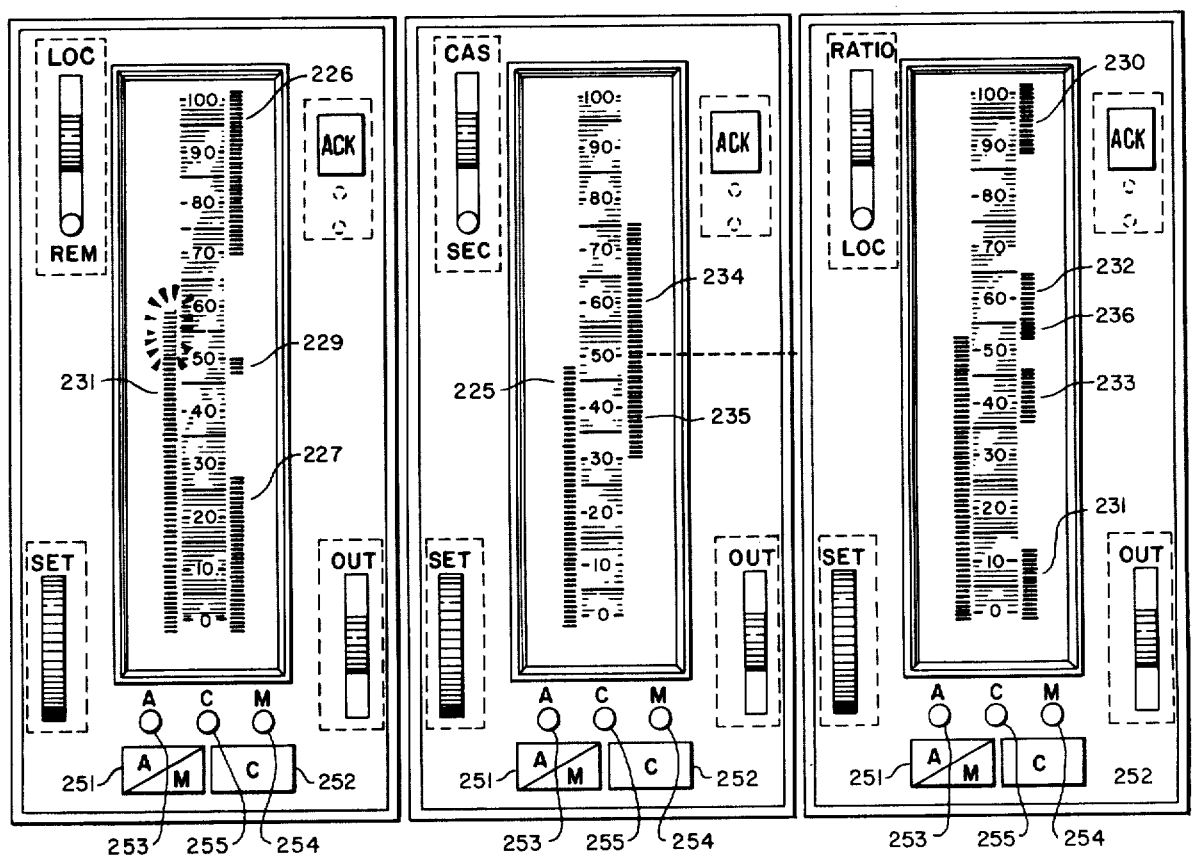
FIGS. 9a, 9b and 9c. Drawings illustrating signals displayed on the electrical display units in a variety of modes.

Embodiment B is a dual indicating electrical display station 11 which, in addition to receiving the analog signal at terminals 1 and 2 of connector part 53a as in embodiment A, also receives another analog signal at terminals 3 and 4 of connector part 53a, such as analog output signal 19 from analog controller 14 and displays the amplitude of the analog output signals as a positive mode bar graph as display 227 in FIG. 9a on right bar graph panel 201. Embodiment B is created by connecting embodiment jumpers 79b to embodiment selector connector 78 to activate the address in micro-processor system 500 for the routines required to produce the control signals for transmission to the control elements in display driver circuit 550. Embodiment B enables operating personnel to observe the amplitude of two analog signals.

Embodiment C is a manual loading electrical display station 11 which, in addition to receiving the analog signal at terminals 1 and 2 of connector part 53a as in embodiment A, transmits an analog manual output signal through terminals 3 and 4 of connector part 53a to analog controller 14 as a analog manual output signal to manipulate valve 20. Embodiment C is created by connecting thumbwheel component 52a to connector 83 and embodiment selector jumpers 79C to embodiment selector connector 78 to activate the address in micro-processor system 500 for the routines required to produce the control signals for transmission to display driver circuit 550. The routines are selected to display the amplitude of analog measurement signal 15 as a positive mode bar graph on left bar graph panel 200 and the analog manual output signal from terminal 2 of connector 83 as a pointer mode bar graph on right bar graph panel 201 as display 229 in FIG. 9a. The pointer mode bar graph is produced by illuminating a small number of cathodes of cathode ladder 215, for example 4, of right bar graph panel 201 so the amplitude of the mid point of the cathodes illuminated is proportional to the amplitiude of the analog signal displayed. Embodiment C enables operating personnel to manually adjust the analog manual output signal that manipulates valve 20 and observe the resulting change in the amplitude of analog measurement signal 15.

Embodiment D is a ratio electrical display station 11 which provides an analog ratio output signal which is the product of an analog input signal multiplied by an analog ratio signal. Embodiment D is created by connecting thumbwheel component 52a to connector 82 and embodiment selector jumpers 79D to embodiment selector connector 78. Embodiment selector jumpers 79D selectively connects terminals 10a, 10b, 11a and 11b to activate the sub-routines in micro-processor system 500 which provide range factors suitable for the computation of the analog ratio output signal. Embodiment selector jumpers 79D also connects routing terminals 31a to 31b to transmit the analog ratio signal from terminals 2 of connector 82 to terminal 6 of analog multiplexer 170. An analog input signal, such as analog measurement signal 15 from analog controller 14 is received at terminals 1 and 2 of connector part 53a. The analog input signal and the analog ratio signal transmitted from terminal 2 of connector 82 are processed through analog multiplexer 170, A/D and D/A converter 175 and micro-processor system 500, including computations in central processing unit 503, to produce the analog ratio output signal. This latter signal is transmitted to terminals 3 and 4 of connector part 53a. As in embodiment A, the analog input signal received at terminals 1 and 2 of connector part 53a is displayed as a positive mode bar graph on left bar graph panel 200. When switch 106 is activated, micro-processor system 500 produces control signals for transmission to the control elements of display driver circuit 550 to replace the display of the analog input signal with a positive mode bar graph having an amplitude proportional to the amplitude of the analog ratio signal transmitted from terminal 2 of connector 82. Micro-processor system 500 also processes the analog ratio output signal to produce control signals for transmission to the control elements of display driver circuit 550 to produce a positive mode bar graph on right bar graph panel 201 having an amplitude proportional to the amplitude of the analog ratio output signal. Embodiment D provides operating personnel with a visual indication of the amplitude of the analog input signal and the analog ratio output signal and the ability to recall the analog ratio signal so they may observed the result of adjusting the analog ratio signal on the analog input signal.

Embodiment E is an automatic/manual electrical display station 11 which provides means for selecting either a locally or remotely generated analog signal for analog output signal 19 to valve 20 and to indicate which analog signal is the analog output signal. Embodiment E is created by connecting mode component 52e to embodiment C and substituting embodiment selector jumpers 79E for embodiment selector jumpers 79C. Embodiment selector jumpers 79E connects routing terminals 31a to 31b to transmit the analog set-point signal from terminal 2 of connector 82 to terminal 6 of analog multiplexer 170. Remotely generated output signal 19 from analog collector 14 is received at terminals 1 and 2 of connector part 53a. The analog manual output signal generated through terminal 2 of connector 83 may be transmitted to analog controller 14 through terminals 3 and 4 of connector part 53a. Embodiment selector jumpers 79E activates the address in micro-processor system 500 for the routines which will process all signals to produce the following described results.

When auto status indicator 254 is illuminated, micro-processor system 500 processes analog output signal 19 received at terminals 1 and 2 of connector part 53a to transmit analog output signal 19 through terminals 3 and 4 of connector part 53a to valve 20. In addition, micro-processor system 500 produces control signals for controlling the control elements in display driver circuit 550 to display a pointer mode bar graph on right bar graph panel 201 having an amplitude proportional to the amplitude of the remotely generated analog output signal 19 received from analog controller 14. By actuating switch 106 of thumbwheel component 52a, operating personnel may recall for display a positive mode bar graph on left bar graph panel 200 having an amplitude proportional to the amplitude of the analog manual output signal transmitted from terminal 2 of connector 83.

By actuating auto/manual switch 251 in mode component 52e, the grounded signal from terminal 1 of connector 250 is processed by micro-processor system 500 to transmit the analog manual output signal through terminals 3 and 4 of connector part 53d to valve 20 and thereby operate valve 20 in a manual mode. Micro-processor system 500 also produces a status signal to the base of transistor 256 of mode component 52e to illuminate manual status indicator 253 and turn off the station signal to the base of transistor 257 and auto status indicator 254. Micro-processor system 500 also produces control signals for controlling the control elements in display driver circuit 550 to display a positive mode bar graph on right bar graph panel 201 having an amplitude proportional to the amplitude of the analog manual output signal transmitted from terminal 2 of connector 83. By actuating switch 106 of thumbwheel component 52a, operating personnel may recall for display a positive mode bar graph on left bar graph panel 200 having an amplitude proportional to the amplitude of the remotely generated analog output signal 19 received from analog controller 14.

Embodiment F is a remote set electrical display station 11 which provides means for transferring analog controller 14 from one mode of operation to the other mode for adjusting analog output signal 19 to valve 20 when analog controller 14 is in manual mode of operation and for indicating which mode analog controller 14 is in. Embodiment F is created by connecting mode component 52e to connector 250, driver component 52b to connector 83 and connecting embodiment selector jumpers 79F in embodiment selector connector 78.

Embodiment selector jumpers 79F connects routing terminals 29A to 30b and 31a to 31b. The later routing terminals transmits the analog set-point signal from terminal 2 of connector 82 to terminal 6 of analog multiplexer 170. Analog measurement signal 15, analog output signal 19 and analog set-point signal 18 from analog controller 14 are received at terminal points 1-2, 3-4, and 5-6 respectively of connector part 53a. Embodiment selector jumpers 79F activates an address in micro-processor system 500 which provides routine to achieve the results described below.

When auto status indicator 254 is illuminated, micro-processor system 500 produces a gating signal at terminal 32 which is transmitted through terminal 17 of connector part 53d to activate the series FET in analog controller 14. Micro-processor system 500 also produces control signals for controlling the control elements in display driver circuit 550 to display a pointer mode bar graph on right bar graph panel 201 having an amplitude proportional to the amplitude of analog output signal 19 received at terminals 3 and 4 of connector part 53a from analog controller 14 and display a positive mode bar graph alternately on left bar graph panel 200, one of which has an amplitude proportional to the amplitude of analog measurement signal 15 received at terminals 1 and 2 of connector part 53a as graphic display 231 in FIG. 9a, and the other of which has an amplitude proportional to the amplitude of analog set-point signal 18 received at terminals 5 and 6 of connector part 53a. Thus, operating personnel may compare the three analog signals displayed and have information about the condition of process 17. The operating personnel can distinguish one bar graph from the other on left bar graph panel 200 by displaying analog measurement signal 15 for a greater time duration than the analog set-point signal.

By actuating auto/manual switch 251 in mode component 52e, analog controller 14 is switched from automatic to manual mode of operation by the process previously described, causing auto status indicator 254 to shift off and manual station indicator 253 to be illuminated. Actuation of auto/manual switch 251 causes analog controller 14 to switch from automatic to manual mode of operation by transmitting a gating signal at terminal 31 through terminal 19 of connector part 53d to activate the shunt FET in analog controller 14. When analog controller 14 is in manual mode, operating personnel may actuate knob 96 of driver component 52b to adjust the output signal 19 to valve 20 in the manner already described. Micro-processor system 500 produces control signals for controlling the control elements in display driver circuit 550 to display a pointer mode bar graph on right bar graph panel 201 having an amplitude proportional to the amplitude of analog output signal 19 received at terminals 3 and 4 of connector part 53a from analog controller 14 and displaying a positive mode bar graph on left bar graph panel 200 having an amplitude proportional to the amplitude of analog measurement signal 15 received at terminals 1 and 2 from analog controller 14. Thus operating personnel may observe the changes in analog output signal 19 resulting from actuating knob 96 and any resulting changes in analog measurement signal 15.

Embodiment G is a remote local set electrical display station 11 which, in addition to providing means for transferring the operation of analog controller 14 from one mode to the other mode and for adjusting the amplitude of analog output signal 19, provides means by which operating personnel located at electrical display station may transfer the operation of analog controller 14 from the analog set-point signal transmitted from terminal 2 of connector 82 to the remotely generated analog set-point signal 19 by operating personnel located at analog controller 14. Embodiment G is created by connecting mode component 53e to connector 250, driver component 52b to connector 83, switch component 52c to connector 80, thumbwheel component 52a to connector 82 and connecting embodiment selector jumpers 79G in embodiment selector connector 78. Embodiment selector jumpers 79G connects routing terminals 29b to 30b and 31a to 31b. The later routing terminals transmits the analog set-point signal from terminal 2 of connector 82 to terminal 6 of analog multiplexer 170. In addition to activating the address in micro-processor system 500 for the routines prescribed for embodiment G, it connects terminals 27a to 27b, 27c to 27d, 28a to 28b and 28c to 28d. At connector part 53a, analog measurement signal 15 is received at terminals 1 and 2, analog output signal 19 is received at terminals 3 and 4, analog set-point signal 18 is received at terminals 7 and 8 and either analog set-point signal 18 or the analog set-point signal transmitted from terminal 2 of connector 82 is transmitted from terminals 9 and 10 to serve as the set-point signal for the operation of analog controller 14. When switch 121 of switch component 52c is in its downward position for local operation, then the analog set-point signal transmitted from terminal 2 of connector 82 is transmitted to analog controller 14 and if in its upward position for remote operation, then analog set-point signal 19 serves as the set-point signal for the operation of analog controller 14. Embodiment selector jumpers 79G activates an address in micro-processor system 500 which provides routines for each of the four modes in which embodiment G may operate; i.e., in remote-automatic, remote-manual, local automatic and local manual.

In all four modes of operation, micro-processor system 500 produces control signals for controlling the control elements in display driver circuit 550 to display pointer-mode bar graph on right bar graph panel 201 having an amplitude proportional to the amplitude of analog output signal 19 received at terminals 3 and 4 of connector part 53a from analog controller 14. When switch 121 of switch component 52c is in its downward position for the local mode of operation so that the analog set-point signal transmitted from terminal 2 of connector 82 is transmitted through terminals 9 and 10 to analog controller 14, actuation of switch 106 of thumbwheel component 52a causes micro-processor system 500 to produce control signals for controlling the control elements of display driver circuit 550 to replace the display of the bar graph representative of analog output signal 19 with a positive mode bar graph having an amplitude proportional to the amplitude of the analog set-point signal 18 received at terminals 7 and 8 of connector part 53a. When switch 121 of switch component 52c is in its upward position for the remote mode of operation so that analog set-point signal 18 received at terminals 7 and 8 of connector part 53a is transmitted through terminals 9 and 10 of connector part 53a to analog controller 14, actuation of switch 106 of thumbwheel component 52a causes micro-processor system 500 to produce control signals for controlling the control elements of display driver circuit 550 to replace the display of the bar graph representative of analog output signal 19 with a positive mode bar graph having an amplitude proportional to the amplitude of the analog set-point signal transmitted from terminal 2 of connector 82. Status indicator 129 in switch component 52c is illuminated when switch 121 is in its upward position for local operation so operating personnel are informed as to which analog set-point signal is being displayed by the actuation of switch 106 of thumbwheel component 52a. Operation of switch 251 in mode component 52e does not affect the display appearing on right bar graph panel 201.

When switch 121 of switch component 52c is in its downward position for the local mode of operation and analog controller is in its manual mode of operation, the analog set-point signal transmitted from terminal 2 of connector 82 serves as the set-point signal transmitted to analog controller 14 and operating personnel may adjust analog output signal 19 by actuating knob 96 of driver component 52b. Micro-processor system 500 produces control signals for controlling control elements in driver display circuit 550 to display on left bar graph panel 200 a positive mode bar graph having an amplitude proportional to the amplitude of analog measurement signal 15 received at terminals hand 2 of connector part 53a. When switch 106 of thumbwheel component 52a is actuated, microprocessor system 500 produces control signals for controlling the control elements in display driver circuit 550 to replace the display of the bar graph representative of analog measurement signal 15 with a positive mode bar graph having an amplitude proportional to the amplitude of the analog set-point signal transmitted from terminal 2 of connector 82. As explained above, actuation of switch 106 also displays analog set-point signal 18 received at terminals 7 and 8 of connector part 53a a right bar graph panel 201 so operating personnel can compare the two analog set-point signals.

When switch 121 of switch component 52c is in its downward position for the local mode of operation and analog controller is in its automatic mode of operation, the analog set-point signal transmitted from terminal 2 of connector 82 is transmitted through terminals 9 and 10 to analog controller 14. Micro-processor system 500 produces control signals for controlling control elements in display driver circuit 550 to display on left bar graph panel 200 alternately in relatively rapid succession a first positive mode bar graph having an amplitude proportional to the amplitude of analog measurement signal 15 received at terminals 1 and 2 of connector part 53a and a second bar graph having an amplitude proportional to the amplitude of the analog set-point signal transmitted from terminal 2 of connector 82. When switch 106 of thumbwheel component 52a is actuated, micro-processor system 500 produces control signals for controlling the control elements in display driver circuit 550 to replace the alternate display of the first bar graph and display only the second bar graph representative of the analog set-point signal transmitted from terminal 2 of thumbwheel component 52a. As explained above, actuation of switch 106 also displays analog set-point signal 18 received at terminals 7 and 8 of connector part 53a on right bar graph panel 201.

When switch 121 of switch component 52c is in its upward position for the remote mode of operation and analog controller 14 is in its automatic mode of operation, analog set-point signal 18 received at terminals 7 and 8 of connector part 53a is transmitted through terminals 9 and 10 of connector part 53a to analog controller 14. Micro-processor system 500 produces control signal for controlling control elements in display driver circuit 550 to display on left bar graph panel 200 alternately in relatively rapid succession a first positive mode bar graph having an amplitude proportional to the amplitude of analog measurement signal 15 received at terminals 1 and 2 of connector part 53a and a second bar graph having an amplitude proportional to the amplitude of analog set-point signal 18 received at terminals 7 and 8 of connector 53a. When switch 106 of thumbwheel component 52a is actuated, micro-processor system 500 produces control signals for controlling control elements in driver display circuit 550 to replace the alternate display of the first bar graph and display only the second bar graph representative of analog set-point signal 18 received at terminals 7 and 8 of connector part 53a. Again, as explained above, actuation of switch 106 also displays the analog set-point signal transmitted from terminal 2 of thumbwheel component 52a on right bar graph panel 201.

Embodiment H is a cascade electrical display station 11 which provides means for operating personnel located at electrical display station 11 to transfer the operation of analog primary controller 24 and analog secondary controller 25 to operating personnel located at analog primary and secondary controllers 24 and 25, and when operation is retained at electrical display station 11, to transfer analog secondary controller 25 from automatic or manual mode to the other mode of operation and when in the manual mode of operation, to manuallly adjust analog secondary output signal 27 from analog secondary controller 25 to valve 20. Embodiment H is identical to embodiment G except that embodiment selector jumpers 79H is substituted for embodiment selector jumpers 79G. Embodiment selector jumpers 79H connects routing terminals 27a to 27b, 29b to 30b and 30a to 31a, of embodiment selector connector 78. Analog secondary measurement signal 31, analog secondary output signal 27 and analog secondary set-point signal are received from analog secondary controller 25 respectively at terminal pairs 1-2, 3-4 and 7-8 of connector part 53a. Analog primary measurement signal 26 and analog primary set-point signal 30 are received from analog primary controller 24 respectively at terminals pairs 5-6 and 11-12 of connector part 53a. A selected analog set-point signal is transmitted through terminals 9 and 10 to secondary controller 25.

When switch 121 of switch component 52c is in its downward position, the analog set-point signal is transmitted from terminal 2 of connector 82 through terminals 9 and 10 of connector part 53a to analog secondary controller 25 an when in its downward position, analog secondary set-point signal received at terminals 7 and 8 of connector part 53a is transmitted to analog secondary controller 25 to serve as the set-point signal for the operation of analog controller 25. Embodiment selector jumpers 79H activated an address in micro-processor system 500 which provides routines for each of the four modes in which embodiment H may operate; i.e., in automatic cascade, in manual cascade, automatic secondary and manual secondary.

In all four modes of operation, micro-processor system 500 produces control signals for controlling control elements in display driver circuit 550 to display pointer mode bar graph on right bar graph panel 201 having an amplitude proportional to the amplitude of analog secondary output signal 27 received at terminals 3 and 4 of connector part 53a from analog secondary controller 25. When switch 121 of switch component 52c is in its upward position, actuation of switch 106 of thumbwheel component 52a causes micro-processor 500 to produce control signals for controlling the control elements of display driver circuit 550 to replace the display of the bar graph repesentative of analog secondary output control signal 27 received at terminals 3 and 4 of connector part 53a with a positive mode bar graph having an amplitude proportional to the amplitude of analog primary measurement signal 26 received at terminals 5 and 6 of connector part 53a. When switch 121 of switch component 52c is in its upward position, actuation of switch 106 of thumbwheel component 52a causes micro-processor system 500 to produce control signals for controlling the control elements of display driver circuit 550 to replace the display of the bar graph representative of analog secondary output signal 27 received at terminals 3 and 4 of connector part 53a with a positive mode bar graph having an amplitude proportional to the amplitude of analog secondary measurement signal 27 received at terminals 1 and 2 of connector part 53a. Status indicator 129 in switch component 52c is illuminated when switch 121 is in its upward position for secondary operation so operating personnel are informed as to which analog measurement signals is being displayed by the actuation of switch 106 of thumbwheel component 52a. Operation of switch 251 in mode component 52e does not affect the display appearing on right bar graph panel 201.

When switch 121 of switch component 52c is in its downward position for the secondary mode of operation and analog secondary controller 25 is in its manual mode of operation, the analog set-point signal transmitted from terminal 2 of connector 82 serves as the set-point signal transmitted to analog secondary controller 25 and operating personnel may adjust analog secondary output signal 27 by actuating knob 96 of driver component 52b. Microprocessor system 500 produces control signals for controlling control elements in display driver circuit 550 to display on left bar graph panel 200 a positive mode bar graph having an amplitude proportional to the amplitude of analog secondary measurement 31 received at terminals 1 and 2 of connector part 53a. When switch 106 of thumbwheel component 52a is actuated, micro-processor system 500 produces control signals for controlling control elements in display driver circuit 550 to replace the display of the bar graph representative of analog secondary measurement signal 31 with a positive mode bar graph having an amplitude proportional to the amplitude of the analog secondary set-point signal received at terminals 7 and 8 of connector part 53a. As explained above, actuation of switch 106 also displays analog primary measurement signal 26 received at terminals 5 and 6 of connector part 53a on right bar graph panel 201 so operating personnel can compare the two signals.

When switch 121 of switch component 52c is in its downward position for secondary mode of operation and analog secondary controller 25 is in its automatic mode of operation, the analog set-point signal transmitted from terminal 2 of connector 82 is transmitted through terminals 9 and 10 to analog secondary controller 25. Micro-processor system 500 produces control signals for controlling control elements in display driver circuit 550 to display on left bar graph panel 200 alternately in relatively rapid succession a first positive mode bar graph having an amplitude proportional to the amplitude of analog secondary measurement signal 31 received at terminals 1 and 2 of connector part 53a and a second positive mode bar graph having an amplitude proportional to the amplitude of the secondary set-point signal received at terminals 7 and 8 of connector part 53a. When switch 106 is thumbwheel component 52a is actuated, the analog secondary set-point signal replaces the alternating analog signals in the manner described above.

When switch 121 of switch component 52c is in its upward position for cascase mode of operation and analog secondary controller is in manual mode of operation, the analog secondary set-point signal received at terminals 7 and 8 of connector part 53a is transmitted through terminals 9 and 10 of cnnector part 53a to analog secondary controller 25. Micro-processor system 500 produces control signals for controlling control elements in display driver circuit 550 to display on left bar graph panel 200 a positive mode bar graph having an amplitude proportional to the amplitude of analog primary measurement signal 26 received at terminals 5 and 6 of connector part 53a. When switch 106 of thumbwheel component 52a is actuated, micro-processor system 500 produces control signals for controlling control elements in display driver circuit 550 to replace the bar graph representative of analog primary measurement signal 36 and display in its place analog primary set-point signal 30 received at terminals 11 and 12 of connector part 53a. As explained above, actuation of switch 106 also displays analog secondary measurement signals 31 on right bar graph panel 201.

When switch 121 of switch component 52c is in its upward position for cascade mode of operation and analog secondary controller 25 is in automatic mode of operation, the analog secondary set-point signal received at terminals 7 and 8 of connector part 53a is transmitted through terminals 9 and 10 to analog secondary controller 25. Micro-processor system 500 produces control signals for controlling control elements in display driver circuit 550 to display on left bar graph panel 200 alternately in relative rapid succession a first positive mode bar graph having an amplitude proportional to the amplitude of analog primary measurement signal 26 received at terminals 5 and 6 of connector part 53a and a second positive mode bar graph having an amplitude proportional to the amplitude of analog primary set-point signal 30 received at terminals 11 and 12 of connector part 53a. When switch 106 in thumbwheel component 52a is actuated, the analog primary set-point signal 30 replaces the alternating signals in the manner described above.

Embodiment I is a ratio-set electrical display station 11 which provides means for transferring analog secondary controller 25 from operating in one mode to the mother mode and switching the set-point signal to analog secondary controller 25 from an analog ratio signal to an analog ratio set-point signal which is the product of analog uncontrolled variable signal 26 multiplied by the analog ratio signal transmitted from terminal 2 of connector 82. Embodiment I is identical to embodiments G and H except that embodiment selector jumpers 79I is substituted for embodiment selector jumpers 79G or 79H. The assignment of analog signals to the terminals of connector part 53a and the connections of the routing terminals of embodiment selector connector 78 by embodiment selector jumpers 79I differs from those for embodiments selector means 79G or 79H. Analog controlled variable signal 31 and analog secondary output signal 27 are received from analog secondary controller 25 at terminal pair 1-2 and 3-4 respectively. Analog uncontrolled variable signal 26 is received from analog primary controller 24 at terminals 7 and 8 of connector part 53a. Embodiment selector jumpers 79I connects routing terminals 30a to 31a and 31a to 31b so that the analog ratio signal transmitted from terminal 2 of connector 82 is fed to terminal 6 of analog multiplexer 170 and when switch 121 of switch component 52c is in its upward position, the analog ratio signal is transmitted through terminals 9 and 10 of connector part 53a to serve as the set-point of analog secondary controller 25. Embodiment selector jumpers 79I also connects routing terminals 27b of embodiment selector connector 78 to 28b so that analog uncontrolled variable signal 26 is transmitted to terminal 4 of analog multiplexer 170. Embodiment selector jumpers 79I also connects routing terminals 28a to 30b of embodiment selector connector 78 so that the calculated analog multiplexer 170 through terminals 9 and 10 of connector part 53a when switch 121 of switch component 52c is in its upward position so the ratio set-point signal serves as the set-point of analog secondary controller 25.

When switch 121 of switch component 52c is in its downward position and analog secondary controller 25 is in its manual mode of operation, micro-processor system 500 produces control signals for controlling control elements in display driver circuit 550 to display on left bar graph panel 200 a positive mode bar graph having an amplitude proportional to the amplitude of analog controlled variable signal 31 and on right bar graph panel 201 a pointer mode bar graph having an amplitude proportional to the amplitude of analog secondary controller output signal 27. When switch 106 of thumbwheel component 52a is actuated, micro-processor system 500 produces control signals for controlling control elements in display driver circuit 550 to substitute on left bar graph panel 200 a positive mode bar graph having an amplitude proportional to the amplitude of the analog ratio signal transmitted from terminal 2 of cnnector 82 for the bar graph representative of analog controlled variable signal 31.

When switch 121 of switch component 52c is in its downward position and analog secondary controller 25 is in its automatic mode of operation, micro-processor system 500 produces control signals for controlling control elements in display driver circuit 550 to display on left bar graph panel 200 alternately in relatively rapid succession a first positive mode bar graph having an amplitude proportional to the amplitude of analog controlled variable signal 31 and a second positive mode bar graph having an amplitude proportional to the amplitude of the analog ratio signal transmitted from terminal 2 of connector 82 and on right bar graph panel 201 a pointer mode bar graph having an amplitude proportional to the amplitude of analog secondary controller output signal 27. When switch 106 of thumbwheel component 52a is actuated, as explained above, a positive mode bar graph is substituted on left bar graph panel 200 for the alternately displayed bar graph having an amplitude proportional to the amplitude of the analog ratio signal transmitted from terminal 2 of connector 82.

When switch 121 of switch component 52c is in its upward position and analog secondary controller 25 is in its manual mode of operation, micro-processor system 500 produced control signals for controlling control elements in display driver circuit 550 to dislay on left bar graph panel 200 a positive mode bar having an amplitude proportional to the amplitude of analog controlled variable signal 31 and on right bar graph panel 201 a pointer mode bar graph having an amplitude proportional to the amplitude of analog secondary output signal 27. When switch 106 of thumbwheel component 52a is actuated, a positive mode bar graph is substituted on left bar graph panel 200 having an amplitude proportional to the amplitude of the calculated analog ratio setpoint signal and a positive mode bar graph is substituted on right bar graph panel 201 having an amplitude proportional to the amplitude of the analog ratio signal transmitted from terminal 2 of connector 82.

When switch 121 of switch component 52c is in its upward position and analog secondary controller 25 is in its automatic mode of operation, micro-processor system 500 produces control signals for controlling control elements in display driver circuit 550 to display on left bar graph panel 200 alternately in rapid succession a first positive mode bar graph having an amplitude proportional to the amplitude of analog controlled variable signal 31 and a second positive mode bar graph having an amplitude proportional to the amplitude of the calculated analog ratio setpoint signal and on right bar graph panel 201, a pointer mode bar graph having an amplitude proportional to the amplitude of analog secondary output signal 27. When switch 106 of thumbwheel component 52a is actuated, a positive mode bar graph is substituted on left bar graph panel 200 having an amplitude proportional to the amplitude of the computed analog ratio set-point signal and substituting on right bar graph panel 201 a positive mode bar graph having an amplitude proportional to the amplitude of the analog ratio signal transmitted from terminal 2 of connector 82.

Embodiment J is an electrical display station 11 created for use with a direct digital control system having back-up analog controllers. Embodiment J is created by connecting thumbwheel component 52a to connector 82, driver component 52b to connector 83, mode component 53e to connector 250 and embodiment selector jumpers 79J to embodiment selector connector 78. Analog measurement signal 15 and analog output signal 35 are received from analog back-up controller 14b respectively at terminals pairs 1-2 and 3-4 of connector part 53a. The analog set-point signal transmitted from terminal 2 of connector 82 is transmitted through terminals 9 and 10 of connector part 53a to serve as the set-point signal for analog back up controller 14b.

When a direct digital control system is operating to control process 17a or analog back up controller 146 is in manual mode, micro-processor system 500 produces control signals for controlling control elements in display driver circuit 550 to display on left bar graph panel 200 a positive mode bar graph having an amplitude proportional to the amplitude of analog measurement signal 15 and on right bar graph panel 201 a pointer mode bar graph having an amplitude proportional to the amplitude of analog output signal 35. When switch 106 of thumbwheel component 106 is actuated, a positive mode bar graph is substituted on left bar graph panel 200 having an amplitude proportional to the amplitude of the analog set-point signal transmitted from terminal 2 of connector 82.

When analog back up controller 14b is in automatic mode of operation, micro-processor system 500 produces control signals for controlling control elements in display driver circuit 550 to display on left bar graph panel 200 alternately in rapid succession a first positive mode bar graph having an amplitude proportional to the amplitude of analog measurement signal 15 and a second positive mode bar graph having an amplitude proportional to the amplitude of the analog set-point signal transmitted from terminal 2 of connector 82 and on right bar graph 201 a pointer mode bar graph 201 having an amplitude proportional to the amplifier of analog output signal 35. When switch 106 of thumbwheel component 52a is actuated, a positive mode bar graph is substituted on left bar graph panel 200 having an amplitude proportional to the amplitude of the analog set-point signal transmitted from terminal 2 of connector 82.

Alarm component 52d may be connected to terminal 81 in most embodiments of electrical display station 11. The addresses activated by embodiment selector jumpers 79J includes routines for processing the signals transmitted to or from connector 81. In order to activate the sub-routines for the desired alarm mode it is necessary to selectively connect terminals 6a, 6b, 7a and 7b of embodiment selector connector 78. In order to activate the subroutines for the desired alarm cut off points, it is necessary to selectively connect terminals 8a, 8b, 9a and 9b of embodiment selector connector 78.

The external alarm mode is adapted for use with some process control instrumentation which include means for generating an alarm signal which activates an annunciator located near electrical display station 11 to warn operating personnel there when an alarm condition exists in process 17. Once alerted, the operating personnel may deactivate the annunciator by actuating knob 99 of acknowledge switch 135. The acknowledge switch 135 grounds a circuit from terminal 6 of connector 81 through terminal 12 of digital multiplexer 180 and terminal 11 micro-processor system 500 to terminal 19a of connector part 53d to deactivate an externally located relay in the annunciator circuit.

The absolute measurement alarm mode is adapted for use when it is important to limit the fluctuations of analog measurement signal 5 from exceedig a high or low trip point value. Operating personnel may adjust the high trip point value by adjusting adjustable resistance 131 and observe the results of the adjustment on a high alarm mode bar grah on right bar graph panel 201 by actuating knob 99 of acknowledge switch 135. The high alarm mode bar graph displayed will be illuminated from the cathode of cathode ladder 215 having a height proportional to the amplitude of the analog high alarm trip point signal transmitted from terminal 2 of connector 81 and extend upwardly to the top of cathode ladder 215 as display 226 of FIG. 9a. In a similar manner, operating personnel may adjust adjustable resistance 132 and observe the results of the admustment as a positive mode bar graph on right bar graph panel 201 by actuating knob 99 of acknowledge switch 135 having an amplitude proportional to the amplitude of the analog low alarm trip point signal transmitted from terminal 4 of connector 81 as display 227 of FIG. 9a. Analog measurement signal 14 received at terminals 1 and 2 of connector part 53a is transmitted through analog multiplexer 170 and connector 175 to micro-processor system 500. The sub-routines activated by embodiment selector card 79 and selective connection of the terminals of embodiment connector 78 cause analog measurement signal 15 and the analog high and low alarm signals transmitted from terminals 2 and 4 of connector 81 to be algebraically added. When analog measurement signal 15 exceeds the analog high alarm signal, microprocessor system 500 transmits control signals for activating control elements in display driver circuit 550 to display right bar graph panel 201 a flashing high alarm alerting mode bar graph having an arbitary fixed span located near the top of the scale as display 230 in FIG. 9c. When analog measurement signal 15 is less than the analog low alarm trip point signal, micro-processor system 500 transmits control signals for controlling control elements in display driver circuit 550 to display on right bar graph 201 a flashing low alarm alerting mode bar graph having an arbitary fixed span located near the bottom of the mode as display 231 in FIG. 9c. Actuation of knob 99 of acknowledge switch 135 changes the signal transmitted from terminal 4 of connector 81 to terminal 12 of digital multiplexer 180 to cause the flashing of the high or low alarm bar graph to be discontinued. During the time acknowledge switch 135 is actuated, high alarm mode bar graph and a positive mode bar graph having an amplitude proportional to the amplitude of the analog low alarm trip point signal will be displayed as display 226 and 227 respectively in FIG. 9a. Microprocessor system 500 also algebraically adds analog measurement signal 15, the analog high and low alarm trip point signals and the high and low alarm cut off points. When analog measurement signal 15 is less than the analog high alarm trip point signal transmitted from terminal 2 of connector 81 by an amount equal to the high cut-off point, then microprocessor system 500 ceases to transmit the control signals for displaying the high alarm mode bar graph. When analog measurement signal 15 is more than the analog low alarm trip point signal transmitted from terminal 6 of connector 81 by an amount equal to the low cut off point, then micro-processor system 500 ceases to transmit the control signals for displaying the positive mode bar graph.

The absolute output alarm mode is similar to the absolute measurement alarm mode except that analog output signal 19 received at terminals 3 and 4 of connector part 53a is substituted for analog measurement signal 15 received at terminals 1 and 2 of connector part 53a.

The deviation alarm mode is adapted for use when it is important to limit the deviation of analog measurement signal 15 from an analog set-point signal. The deviation alarm mode may be used in embodiment D and G-J in which the analog set-point signal is transmitted from terminal 2 of connector 82. The sub-routines activated by embodiment selector connector jumpers 79 and selective connection of the terminals of embodiment selector connector 78 cause analog measurement signal 15 to be algebraically added to the analog set-point signal transmitted from terminals 2 of connector 82. When the algebraic sum of analog measurement signal 15 and the analog set-point signal transmitted from terminal 2 of connector 82 exceeds the analog high alarm trip point signal transmitted from terminal 2 of connector 81, micro-processor system 500 transmits control signals for controlling control elements in display driver circuit 550 to display on right bar graph panel 201 a flashing high deviation alerting mode bar graph having a fixed span just above 50% of scale as display 232 in FIG. 9c as shown at 228 in FIG. 9b. When the algebraic sum of analog measurement signal 15 and the analog set-point signal transmitted from terminal 2 of connector 82 is less than the analog low alarm trip point signal transmitted from terminal 4 of connector 81, micro-processor system 500 transmits control signals for controlling control elements in display driver circuit 550 to display on right bar graph panel 201 a flashing low deviation alerting mode bar graph having a fixed span located just below 50% of scale as display 233 in FIG. 9c. Actuation of knob 99 of acknowledge switch 135 changes the signal transmitted from terminal 6 of connector 81 to cause micro-processor system 500 to cease to transmit the control signals for displaying the flashing high deviation alerting mode or low deviation alerting mode signal bar graph. During the time acknowledge switch 135 is actuated, a high deviation mode bar graph and a low deviation mode bar graph will be displayed ad displays 234 and 235 respectively in FIG. 9b. The high deviation mode bar graph is produced by illuminating cathode ladder 215 from a cathode representative of 50% of scale upwardly to an amplitude proportional to the amplitude of the analog high alarm trip-point signal. The low deviation mode bar graph is produced by illuminating cathode ladder 215 from a cathode representative of 50% of scale downwardly to an amplitude proportional to the amplitude of the analog low alarm trip point signal.

Operating personnel are often faced with the task of monitoring a number of electrical display stations. The use of the arbitrary fixed span alarm alerting mode bar graph manner that the various alarm alerting mode bar graphs are at finite separate locations on the same bar graph panel so each alarm alerting mode is easily identified at a glance. When the high alarm alerting mode bar graph appears on at the upper segment of the panel or the low alarm alerting bar graph span appears at the lower segment of the panel, operating personnel know that its absolute measurement or absolute output mode of alarm is in use and whether a high or a low alarm condition exists. When the high deviation alerting mode bar graph appears directly above the 50% of scale position or the low deviation alerting mode bar graph appears directly below the 50% of scale position, operating personnel know that the deviation mode of alarm is in use and whether a high or a low alarm deviation condition exists.

When alarm component 52d is connected to an embodiment of electrical display station 11 which displays a pointer mode bar graph on right bar graph panel 201, the control signals which activate the control elements in display driver circuit 550 display alternating on alternate scans simultaneously both the pointer mode bar graph and the particular alarm alerting mode bar graph prescribed for that embodiment. When the amplitude of the pointer mode bar graph requires the illumination of the same individual cathodes, the brighter illuminated pointer mode bar graph as display 236 is distinguishable from the alarm alerting mode bar graph whether the alarm alerting mode bar graph is flashing or not.

The ten embodiments which have been described teach the features of this invention. It is apparent from the above description that the universal module can be adapted to create additional embodiments by the addition of other components and by providing an address for each additional embodiment included in the line of electrical display stations.

In summary, this invention provides a universal module;

(1) which is adapted to serve as the basis for creating an entire line of electrical display stations;

(2) to which can be connected by relatively unskilled personnel selected combinations of components to create the embodiments;

(3) which have a more extensive choice than prior apparatus in the number of signals which may be displayed and in the modes in which they may be displayed;

(4) which provides means for switching and recalling the display of signals at times when the information is required for the control of the process;

(5) in which a micro-processor system provides the dual function of producing control signals to control elements in the driver display circuit and performs the routines prescribed for each embodiment;

(6) in which the energization of the electrical display unit is synchronized with the production of the control signals by utilizing a reference frequency for both purposes; and (7) in which a routine in the micro-processor system may be provided for switching between a remotely and locally generated set-point signal without upsetting the process being controlled:

We claim:

1. In an industrial process control system for use with complex processes having a number of conditions the values of which are sensed to produce measurement signals used to develop corresponding control signals for elements such as valves and the like; each combination of measured value and corresponding signal defining a process control loop, each loop including an individual analog controller arranged to compare the measurement signal with a preselected set point signal and to produce a corresponding control signal responsive to the difference between the measurement and set point signals; said analog controller being any one of a number of different functional types, such as for primary analog control or cascade control and the like, according to the particular process control requirement of each loop; each loop further including signal display means to present visual indications of selected operational information such as measurement signal or control signal levels;

apparatus providing improved means cooperable with any selected analog controller of said different functional types comprising:

(1) a display station remotely positioned from said selected analog controller and having a front panel with signal-controllable display means arranged to present to an operator a visual image indicating the value of at least one analog signal level respecting a single corresponding process control loop;

(2) transmission circuit means providing a number of individual signal circuits, said transmission circuit means connecting said display station with said selected analog controller and providing for transmission therebetween in both directions;

(3) universal module circuit means located at said display station and coupled to said transmission circuit means, said universal module circuit means comprising logic circuit means to receive information signals from said selected analog controller and to control the operation of said display means to present a visual indication of at least one of said received information signals, said logic circuits means including a plurality of sets of signal paths for effectuating display control operations respecting each of said different functional types;

(4) manually-shiftable selector means coupled to said logic circuit means and operable to condition said logic circuit means into any one of a number of different operating modes by selectively actuating predetermined ones from said sets of signal paths, each one of such different operating modes providing correspondingly different display arrangements for preselected information signals to conform with the type of analog controller coupled to the other end of said transmission circuit means; and (5) said logic circuit means being conditioned by said selector means into a dedicated operating mode to control said display means to provide for the display of the particular analog signals delivered by said selected controller in accordance with the type of said analog controller.

2. Apparatus as claimed in claim 1 including:
a plurality of pluggable operator control components;
a plurality of receptacles on said front face having connections to said logic circuit means and being adapted to receive said operator control components in predetermined ones of said receptacles, said components being operable when engaged in said receptacles to condition said selected controller by producing function-generating signals in accordance with said dedicated operating mode;
said logic circuit means including means for processing said function-generating signals for transmission over said transmission circuit means to said selected controller and for display on said front panel.

3. Apparatus as claimed in claim 2 wherein a first component is plugged into a first one of said receptacles, said first component establishing through said logic circuit means a set point value for said selected controller.

4. Apparatus as claimed in claim 3 wherein said first component is a potentiometer providing means for altering said set point value at said display station.

5. Apparatus as claimed in claim 2 wherein a second and different component is plugged into a second receptacle, said second component establishing through said logic circuit means a signal for transferring said selected controller from automatic to manual mode of operation, the output of said controller being held at its just prior value while in the manual mode;
means operable with said second component for selecting one of two set point values for said selected controller;
means under the control of said logic circuit means for allowing said controller to stabilize for a finite period of time after said one set point value is selected and for thereafter transferring said controller back to automatic mode of operation;
whereby a sudden change in the output signal of said selected controller is prevented.

6. Apparatus as claimed in claim 5 wherein one of said set point values is generated at said display station through said logic circuit means and the other of said set point values is generated by a remote signal received at said display sation over said transmission circuit means.

7. Apparatus as claimed in claim 2 including a mode selector switch coupled to said logic circuit means and operable therewith for manually transferring said selected controller from automatic to manual mode of operation.

8. Apparatus as claimed in claim 7 wherein said third component includes switch means having a plurality of positions for driving said output value up or down at variable speeds.

9. Apparatus as claimed in claim 2 wherein analog signals representing process measurement, set point and output values are received at said display station over said transmission circuit means and processed by said logic circuit means for display thereof;
a fourth and different component plugged into a fourth receptacle, said fourth component operable with said logic circuit means to produce on said display sation an annunciation of alarm conditions when the magnitude of certain of said analog signals exceed predetermined values.

10. Apparatus as claimed in claim 9 wherein said fourth component includes alarm jumper selection means operable with said logic circuit means for displaying in one region of said display station preselected alarm conditions representing either high and low absolute alarms on said measurement signal, or high and low absolute alarms on said output signal, or high and low deviation alarms when the difference in set point and measurement values exceed predetermined limits.

11. Apparatus as claimed in claim 10 wherein said preselected conditions are caused to be intermittently displayed in said one region;
said fourth component including first switch means operable with said logic circuit means for acknowledging said alarm conditions by providing a continuous display thereof when activated by an operator.

12. Apparatus as claimed in claim 11 wherein each of said preselecfted alarm conditions is displayed at distinct and separate locations in said one region so that the nature of the alarm condition is easily identified at a glance by said operator.

13. Apparatus as claimed in claim 12 wherein an analog signal representing said output value is continuously displayed in said one region even during the display of said alarm conditions;
said output value being displayed as a pointer mode bar graph movable over the full scale of said one region;
said logic circuit means producing a signal to enhance the brightness of said output pointer graph when said graph is superimposed over said display alarm conditions, thereby providing a continuous display of said output value.

14. Apparatus as claimed in claim 10 wherein said fourth component includes second switch means operable with said logic circuit means to produce on said display station an indicia of the magnitude of the trip points for said alarm conditions;
said fourth component further including a plurality of variable resistance means coupled to said circuit means to adjust the value of said trip points.

15. Apparatus as claimed in claim 1 wherein said display station includes at least one display panel of the gaseous discharge type.

16. Apparatus as claimed in claim 15 including a second display panel in generally side-by-side relationship wherein certain of said preselected information signals are presented on one panel and certain other of such information signals are presented on the other panel.

* * * * *